(12) United States Patent
Jha et al.

(10) Patent No.: US 12,417,023 B2
(45) Date of Patent: Sep. 16, 2025

(54) HOST DEVICE CACHING OF FLASH MEMORY ADDRESS MAPPINGS

(71) Applicant: QUALCOMM Incorporated, San Diego, CA (US)

(72) Inventors: Pratibind Kumar Jha, Hyderabad (IN); Manish Garg, Hyderabad (IN); Prakhar Srivastava, Lucknow (IN); Santhosh Reddy Akavaram, Hyderabad (IN); Hung Vuong, Coronado, CA (US); Abhishek Ghosh, Kolkata (IN); Shubham Kanwal, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 48 days.

(21) Appl. No.: 18/365,700

(22) Filed: Aug. 4, 2023

(65) Prior Publication Data
US 2025/0044945 A1  Feb. 6, 2025

(51) Int. Cl.
| G06F 3/06 | (2006.01) |
| G06F 12/0802 | (2016.01) |
| G06F 12/1009 | (2016.01) |

(52) U.S. Cl.
CPC .......... G06F 3/0611 (2013.01); G06F 3/0659 (2013.01); G06F 3/0679 (2013.01);
(Continued)

(58) Field of Classification Search
CPC .... G06F 3/0611; G06F 3/0659; G06F 3/0679; G06F 12/0802; G06F 12/1009; G06F 2212/45
See application file for complete search history.

(56) References Cited

U.S. PATENT DOCUMENTS

| 9,104,327 B2 * | 8/2015 | Gorobets ................ G06F 3/064 |
| 9,141,527 B2 * | 9/2015 | Atkisson ............. G06F 12/0895 |

(Continued)

OTHER PUBLICATIONS

Anonymous: "Universal Flash Storage (UFS) Host Performance Booster (HPB) Extension, Version 2.0", JEDEC Standard, JEDEC—JEDEC Solid State Technology Association vol. JESD220-3A (Revision of JESD220-3, Jan. 2020), Sep. 1, 2020, Jul. 31, 2024, pp. 1-42, XP009541919.

(Continued)

*Primary Examiner* — Tim T Vo
*Assistant Examiner* — Christian Joseph O'Connell
(74) *Attorney, Agent, or Firm* — Moore IP

(57) ABSTRACT

A host device includes system memory that includes a logical-to-physical (L2P) cache and a second cache. The host device also includes a host controller interface (HCI) configured to be coupled to a flash memory device. The HCI is configured to determine that a particular region of a L2P address mapping table is to be removed from the L2P cache. The L2P address mapping table is configured to include mappings between logical memory addresses and physical memory addresses of the flash memory device. The HCI is also configured to identify a particular sub-region of the particular region having an access metric that satisfies a retention criterion. The HCI is further configured to store the particular sub-region into the second cache. The HCI is also configured to remove the particular region from the L2P cache.

30 Claims, 14 Drawing Sheets

(52) U.S. Cl.
CPC ...... *G06F 12/0802* (2013.01); *G06F 12/1009* (2013.01); *G06F 2212/45* (2013.01)

(56) References Cited

U.S. PATENT DOCUMENTS

| | | |
|---|---|---|
| 11,194,736 B2 * | 12/2021 | Kang .................. G06F 12/0246 |
| 11,693,781 B2 | 7/2023 | Minopoli et al. |
| 2016/0188490 A1 * | 6/2016 | Samih .................. G11C 7/1072 |
| | | 711/135 |
| 2020/0226072 A1 | 7/2020 | Kang et al. |
| 2022/0004489 A1 | 1/2022 | Cariello |
| 2022/0058134 A1 * | 2/2022 | Minopoli ............ G06F 12/0866 |
| 2022/0156185 A1 * | 5/2022 | Colella ................ G06F 12/0223 |
| 2023/0062372 A1 * | 3/2023 | Cariello ................ G06F 3/0659 |

OTHER PUBLICATIONS

International Search Report and Written Opinion—PCT/US2024/032850—ISA/EPO—Sep. 2, 2024.

* cited by examiner

HOST DEVICE CACHING OF FLASH MEMORY ADDRESS MAPPINGS

I. FIELD

The present disclosure is generally related to caching, at a host device, address mappings of a flash memory device.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to operate as a host device that can store and retrieve data from a flash memory device. For example, the host device can retrieve audio, an image, a video, a document, etc. stored on the flash memory device. Latency associated with reading data from the flash memory device can adversely impact user experience at the host device.

III. SUMMARY

According to one implementation of the present disclosure, a host device includes system memory that includes a logical-to-physical (L2P) cache and a second cache. The host device also includes a host controller interface (HCI) configured to be coupled to a flash memory device. The HCI is configured to determine that a particular region of a L2P address mapping table is to be removed from the L2P cache. The L2P address mapping table is configured to include mappings between logical memory addresses and physical memory addresses of the flash memory device. The HCI is also configured to identify a particular sub-region of the particular region having an access metric that satisfies a retention criterion. The HCI is further configured to store the particular sub-region into the second cache. The HCI is also configured to remove the particular region from the L2P cache.

According to another implementation of the present disclosure, a method includes, at a host device coupled to a flash memory device, determining that a particular region of a logical-to-physical (L2P) mapping table is to be removed from a L2P cache of the host device. The L2P address mapping table is configured to include mappings between logical memory addresses and physical memory addresses of the flash memory device. The method also includes identifying a particular sub-region of the particular region having an access metric that satisfies a retention criterion. The method further includes storing the particular sub-region into a second cache of the host device. The method also includes removing the particular region from the L2P cache.

According to another implementation of the present disclosure, a non-transitory computer-readable medium stores instructions that, when executed by one or more processors, cause the one or more processors to determine that a particular region of a logical-to-physical (L2P) mapping table is to be removed from a L2P cache of a host device. The L2P address mapping table is configured to include mappings between logical memory addresses and physical memory addresses of a flash memory device. The instructions further cause the one or more processors to identify a particular sub-region of the particular region having an access metric that satisfies a retention criterion. The instructions also cause the one or more processors to store the particular sub-region into a second cache of the host device. The instructions further cause the one or more processors to remove the particular region from the L2P cache.

According to another implementation of the present disclosure, an apparatus includes means for determining that a particular region of a logical-to-physical (L2P) mapping table is to be removed from a L2P cache of a host device. The L2P address mapping table is configured to include mappings between logical memory addresses and physical memory addresses of a flash memory device. The apparatus also includes means for identifying a particular sub-region of the particular region having an access metric that satisfies a retention criterion. The apparatus further includes means for storing the particular sub-region into a second cache of the host device. The apparatus also includes means for removing the particular region from the L2P cache.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
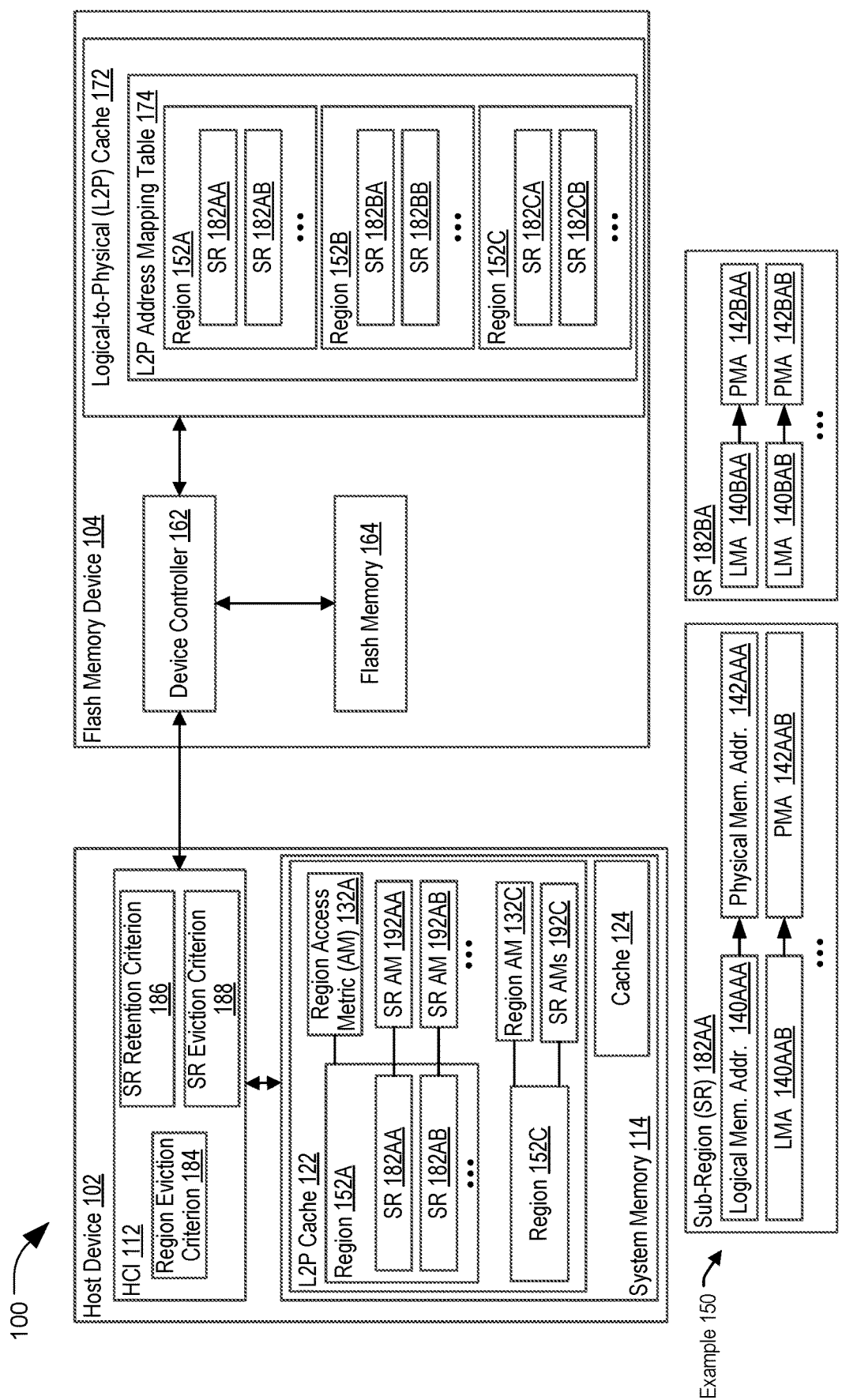
FIG. 1 is a block diagram of a particular illustrative aspect of a system operable to perform host device caching of address mappings of a flash memory device, in accordance with some examples of the present disclosure.

Computing devices often incorporate functionality to store and retrieve data from a flash memory device. For example, a host device can retrieve audio, an image, a video, a document, etc. stored on the flash memory device. The flash memory device maps logical memory addresses (e.g., file system addresses) used by the host device to physical memory addresses of the flash memory. Mapping logical memory addresses to physical memory addresses provides advantages in managing flash memory. For example, the flash memory device can move frequently accessed data to different memory cells to balance memory cell usage and prolong overall memory cell life.

The flash memory device includes a logical-to-physical (L2P) cache that stores a L2P address mapping table that includes mappings of the logical memory addresses to corresponding physical memory addresses of the flash memory. To access a logical memory address, the host device sends a memory access request indicating the logical memory address to the flash memory device. The flash memory device uses the L2P address mapping table to obtain a physical memory address corresponding to the logical memory address, and performs the memory access at the physical memory address. To reduce a memory access latency associated with the flash memory device obtaining the physical memory address from the L2P address mapping table for each memory access, the host device can store some of the address mappings at a L2P cache at the host device and send a memory access request with the physical memory address to the flash memory device.

In an example, the logical memory address space is divided into regions, and each region includes a plurality of sub-regions. The host device activates a first sub-region in response to determining that a first logical memory address to be accessed is included in the first sub-region and that the first sub-region is not stored in the L2P cache at the host device. Activating the first sub-region includes sending, to the flash memory device, a first request to activate the first sub-region. The flash memory device, in response to receiving the first request, uses the L2P cache at the flash memory device to determine mappings of a first region that includes the first sub-region and sends the mappings to the host device. The host device stores the mappings of the first region in the L2P cache at the host device. As used herein, an "active sub-region" refers to a sub-region that is stored in the L2P cache at the host device. As used herein, an "active region" refers to a region with at least one sub-region stored in the L2P cache at the host device. A "sub-region" is used interchangeably with "mappings of the sub-region." A "region" is used interchangeably with "mappings of the region."

After storing the first region into the L2P cache at the host device, the host device sends, to the flash memory device, a second request to activate a second sub-region. For example, the host device sends the second request in response to determining that a second logical memory address to be accessed is included in the second sub-region and that the second sub-region is not stored in the L2P cache at the host device. The flash memory device, in response to receiving the second request, uses the L2P cache at the flash memory device to determine mappings of a second region that includes the second sub-region and sends the mappings of the second region to the host device.

The host device, in response to receiving the second region and determining that the L2P cache at the host device is full, selects a region to evict from the L2P cache to make space for the second region. Various eviction criteria can be used to select the region to evict. For example, a least accessed region can be selected for eviction, a region that is added earliest to the L2P cache can be selected for eviction, etc. The selected region (e.g., the first region) can include one or more sub-regions that are more frequently accessed at the host device than other sub-regions. Evicting all the sub-regions of the selected region can increase the chance of a cache miss at the host device and increase memory access latency associated with requesting mappings of sub-regions of the evicted region.

Systems and methods of hybrid caching at the host device are disclosed. For example, the host device includes a second cache that is used to store one or more sub-regions of a region that is evicted from the L2P cache at the host device. To illustrate, when the first region is to be evicted to make room for the second region, the host device selects a first sub-region of the first region based on a retention criterion and copies the first sub-region to the second cache prior to replacing the first region with the second region in the L2P cache of the host device.

Subsequently, to perform a memory access of a first logical memory address of the first sub-region, such as to read data from the flash memory device, the host device accesses evicted data from the L2P cache that has been copied into the second cache and reads a first physical memory address associated with the first logical memory address from the second cache. The host device sends, to the flash memory device, a memory access request (e.g., a read instruction) indicating the first physical memory address from which to read the requested data. Because the host device was able to retrieve the first physical address from the second cache even though the first region had been evicted from the L2P cache, the host device was able to avoid the delay associated with requesting the first region from the flash memory device and re-storing the first region into the L2P cache at the host device. In other words, storing the first sub-region in the second cache reduces memory access latency associated with retrieving mappings of the first sub-region.

Figure 14:
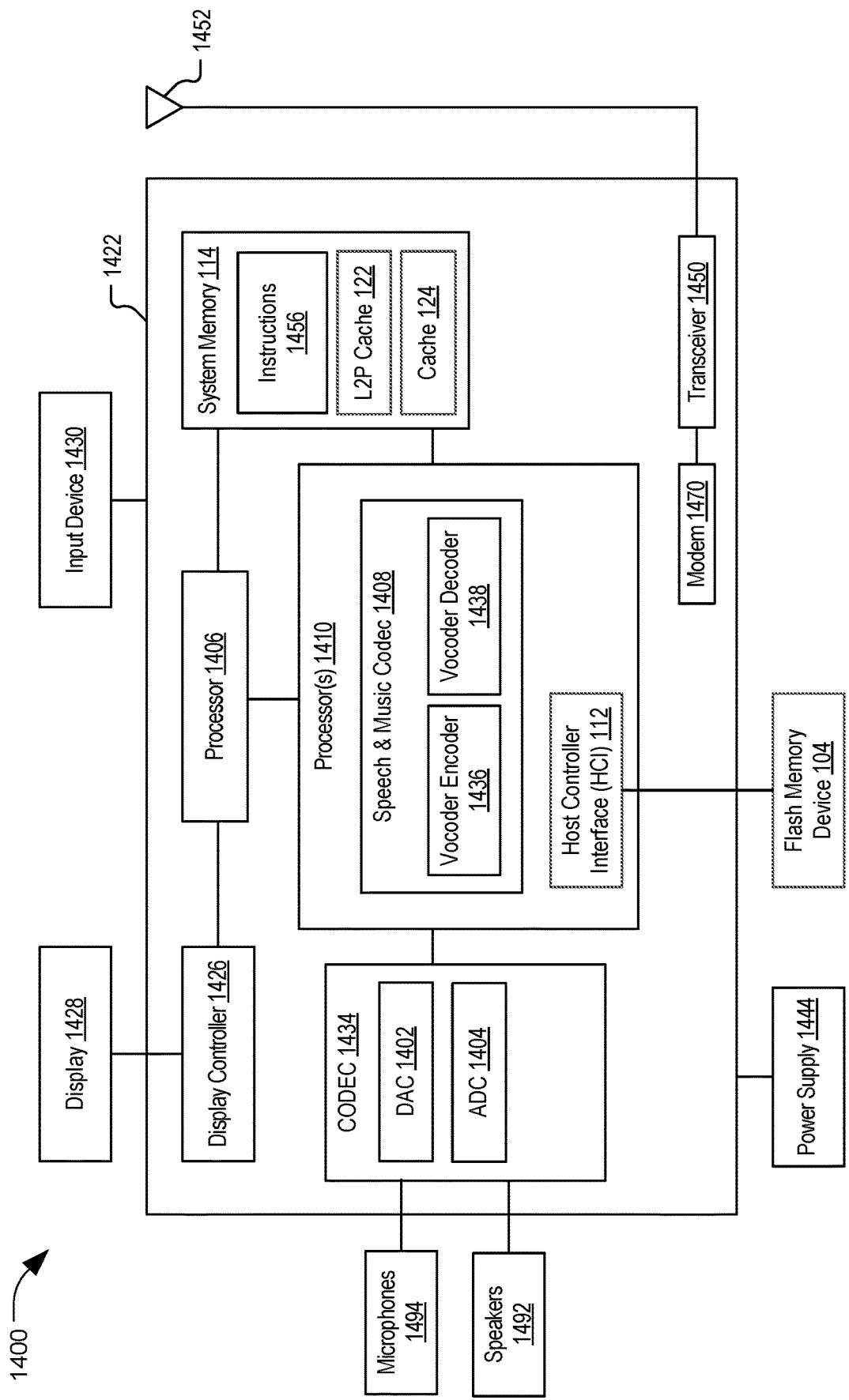
FIG. 14 is a block diagram of a particular illustrative example of a device that is operable to perform host device caching of address mappings of a flash memory device, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 14 depicts a device 1400 including one or more processors ("processor(s)" 1410 of FIG. 14), which indicates that in some implementations the device 1400 includes a single processor 1410 and in other implementations the device 1400 includes multiple processors 1410. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple regions are illustrated and associated with reference numbers 152A, 152B, and 152C. When referring to a particular one of these regions, such as a region 152A, the distinguishing letter "A" is used. However, when referring to any arbitrary one of these regions or to these regions as a group, the reference number 152 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect is shown of a system 100 that is configured to perform host device caching of address mappings of a flash memory device. The system 100 includes a host device 102 that is configured to be coupled to a flash memory device 104.

The flash memory device 104 includes a device controller 162 that is coupled to a flash memory 164 (e.g., NAND memory). The flash memory device 104 includes a L2P cache 172 (e.g., static random access memory (SRAM)). The L2P cache 172 is configured to store a L2P address mapping table 174. The L2P address mapping table 174 is configured to include mappings between logical memory addresses 140 (e.g., file system addresses at the host device 102) and physical memory addresses 142 of the flash memory 164.

In an example, a logical memory address space is logically divided into regions 152, such as a region 152A, a region 152B, a region 152C, one or more additional regions, or a combination thereof. Each region 152 includes one or more sub-regions (SRs) 182. For example, the region 152A includes sub-regions 182A, such as a sub-region (SR) 182AA, a sub-region 182AB, one or more additional sub-regions, or a combination thereof. As another example, the region 152B includes sub-regions 182B, such as a sub-region 182BA, a sub-region 182BB, one or more additional sub-regions, or a combination thereof. As yet another example, the region 152C includes sub-regions 182C, such as a sub-region 182CA, a sub-region 182CB, one or more additional sub-regions, or a combination thereof.

In a particular implementation, each of the regions 152 includes the same (e.g., a pre-determined) count of sub-regions 182. According to other implementations, the region 152A includes a first count of sub-regions 182 that is distinct from a second count of sub-regions 182 included in the region 152B. In an example, the sub-region 182AA corresponds to a first logical memory address range and the sub-region 182BA corresponds to a second logical memory address range that is distinct from the first logical memory address range. In a particular implementation, a first size of the first logical memory address range is equal to a second size of the second logical memory address range. In another implementation, the first size of the first logical memory address range is greater than the second size of the second logical memory address range.

According to some implementations, a size of the L2P cache 172 is greater than a size of the L2P cache 122. In a particular aspect, the size of the L2P cache 122 is based on user input, default data, a configuration setting, or a combination thereof. In a particular example, if each of the regions 152 has a predetermined region size (e.g., bHPBRegionSize=2 gigabytes (GB)) and with a pre-determined logical block size (e.g., bHPBSubRegion Size=4 kilobyte (KB)), each of the regions 152 includes a pre-determined count of sub-regions 182 (e.g., 2 GB/4 KB=500000). With up to a threshold count of active regions (e.g., wDeviceMaxActiveHPBRegions=10) supported and a pre-determined size (e.g., 8 bytes) of each entry in the L2P cache 122, the host device 102 can allocate a first size (e.g., 500000*10*8 bytes=40 MB) to the L2P cache 122. If the each of the regions 152 has a smaller predetermined region size (e.g., bHPBRegionSize=32 megabytes (MB)), each of the regions 152 includes a smaller pre-determined count of sub-regions 182 (e.g., 32 MB/4 KB=8000) and the same size (e.g., 8000*640*8 bytes=40 MB) of the L2P cache 122 can be used to store a greater count (e.g., 640) of active regions.

Each of the sub-regions 182 includes one or more mappings between the logical memory addresses 140 and the physical memory addresses 142. In an example 150, the sub-region 182AA includes mappings between logical memory addresses 140AA and physical memory addresses 142AA, and the sub-region 182BA includes mappings between logical memory addresses 140BA and physical memory addresses 142BA. To illustrate, the sub-region 182AA includes a mapping between a logical memory address (LMA) 140AAA and a physical memory address (PMA) 142AAA, a mapping between a logical memory address 140AAB and a physical memory address 142AAB, one or more additional mappings, or a combination thereof. The sub-region 182BA includes a mapping between a logical memory address 140BAA and a physical memory address 142BAA, a mapping between a logical memory address 140BAB and a physical memory address 142BAB, one or more additional mappings, or a combination thereof.

The host device 102 includes a host controller interface (HCI) 112 that is coupled to a system memory 114 (e.g., a system-on-chip (SOC) dynamic random access memory (DRAM)). The system memory 114 includes a logical-to-physical (L2P) cache 122 and a cache 124. In a particular implementation, the L2P cache 122 corresponds to a Host Performance Booster (HPB) cache. In a particular implementation, the cache 124 is implemented in a recently inactivated region (RIR) partition of the system memory 114. The HCI 112 is configured to be coupled to the flash memory device 104. In an example, the HCI 112 is configured to communicate with the device controller 162 of the flash memory device 104. According to some implementations, the HCI 112 is configured to send one or more commands to the device controller 162, and the device controller 162 is configured to send a response to a command received from the HCI 112.

The HCI 112 is configured to use hybrid caching to perform memory accesses (e.g., read or write) of logical memory addresses 140. For example, the HCI 112 is configured to perform cache lookups for mappings of logical memory addresses 140 in the L2P cache 122, perform cache lookups for mappings of logical memory addresses 140 in the cache 124 for cache misses in the L2P cache 122, and retrieve mappings from the L2P cache 172 of the flash memory device 104 for cache misses in the L2P cache 122, as further described with reference to FIGS. 2-6. The device controller 162 is configured to provide mappings to the HCI 112, as further described with reference to FIGS. 4-6.

The HCI 112 is configured to evict a region 152 from the L2P cache 122 based on a region eviction criterion 184, as further described with reference to FIG. 5. For example, the HCI 112 is configured to, in response to determining that the region 152B is to be stored in the L2P cache 122 and that the L2P cache 122 is full, select the region 152A for eviction from the L2P cache 122 based on the region eviction criterion 184 and select a sub-region 182AA of the region 152A for retention in the cache 124 based on a sub-region retention criterion 186, as further described with reference to FIG. 5. It should be understood that a single sub-region 182 (of the region 152A to be evicted) satisfying the sub-region retention criterion 186 and being retained in the cache 124 is provided as an illustrative example. In other examples, multiple sub-regions 182 (of the region 152A to be evicted) can satisfy the sub-region retention criterion 186 and be retained in the cache 124. In yet other examples, none of the sub-regions 182 (of the region 152A to be evicted) satisfy the sub-region retention criterion 186 and are therefore not retained in the cache 124 when the region 152A is evicted from the L2P cache 122. To illustrate, retention in the cache 124 of a sub-region 182 of the region 152A to be evicted can be selective based on the sub-region retention criterion 186.

The HCI 112 is configured to evict a sub-region 182 from the cache 124 based on a sub-region eviction criterion 188, as further described with reference to FIG. 6. For example, the HCI 112 is configured to, in response to determining that a sub-region 182AA is to be stored in the cache 124 and that the cache 124 is full, select a sub-region 182 for eviction from the cache 124 based on the sub-region eviction criterion 188, as further described with reference to FIG. 6. In a particular aspect, the region eviction criterion 184, the sub-region retention criterion 186, the sub-region eviction criterion 188, or a combination thereof, are based on a user input, a configuration setting, default data, or a combination thereof.

The HCI 112 is configured to, in response to a cache hit resulting from a cache lookup in the L2P cache 122 or a cache lookup in the cache 124, send a memory access request to the device controller 162. The device controller 162 is configured to, in response to receiving the memory access request, perform the memory access (read or write) at the flash memory 164, as further described with reference to FIGS. 2-3.

According to some implementations, the device controller 162 is configured to notify the HCI 112 that a region 152 is to be inactivated, a sub-region 182 is to be activated, or both, as further described with reference to FIGS. 7-9. According to some implementations, the device controller 162 is configured to notify the HCI 112 that a sub-region 182 is to be updated, as further described with reference to FIGS. 10-11.

During operation, in an illustrative example in which the regions 152A and 152B have not yet been stored in the L2P cache 122, the HCI 112 determines that a memory access (e.g., a read or a write) is to be performed of the logical memory address 140AAA (e.g., a logical memory address that is included in the sub-region 182AA of the region 152A). For example, the HCI 112 determines that the memory access is to be performed responsive to receiving a memory access request from a file system of the host device 102.

The HCI 112, in response to determining that a memory access is to be performed of the logical memory address 140AAA, performs a cache lookup of the logical memory address 140AAA in the L2P cache 122. Performing a cache lookup at the L2P cache 122 includes comparing the logical memory address 140AAA of data to be accessed to logical addresses (e.g., logical address ranges) of the regions 152 stored in the L2P cache 122. The HCI 112, in response to determining that the logical memory address 140AAA does not match (e.g., is not included in) the logical addresses (e.g., the logical address ranges) of any of the regions 152 stored in the L2P cache 122, detects a cache miss resulting from the cache lookup in the L2P cache 122.

The HCI 112, in response to detecting the cache miss resulting from the cache lookup in the L2P cache 122, performs a cache lookup of the logical memory address 140AAA in the cache 124. Performing a cache lookup at the cache 124 includes comparing the logical memory address 140AAA to logical addresses (e.g., logical address ranges) of the sub-regions 182 stored in the cache 124. The HCI 112, in response to determining that the logical memory address 140AAA does not match (e.g., is not included in) the logical addresses (e.g., the logical address ranges) of any of the sub-regions 182 stored in the cache 124, detects a cache miss resulting from the cache lookup in the cache 124.

The HCI 112, in response to the cache miss resulting from the cache lookup in the cache 124, performs a sub-region activation of the sub-region 182AA that includes the logical memory address 140AAA. For example, performing the sub-region activation includes sending an activate request to the device controller 162 to activate the sub-region 182AA. To illustrate, the HCI 112 sends the activate request subsequent to determining that the L2P cache 122 is not full (e.g., the L2P cache 122 has available space to add the region 152A).

The device controller 162, in response to receiving the activate request, retrieves the region 152A (that includes the sub-region 182AA to be activated) from the L2P address mapping table 174 and sends the region 152A to the HCI 112. The HCI 112 stores the region 152A in the L2P cache 122 and performs a cache lookup of the logical memory address 140AAA in the L2P cache 122.

The HCI 112, in response to determining that the logical memory address 140AAA now matches (e.g., is included in) the logical addresses (e.g., logical address ranges) of the region 152A stored in the L2P cache 122, detects a cache hit resulting from the cache lookup in the L2P cache 122. The HCI 112, in response to detecting the cache hit resulting from the cache lookup in the L2P cache 122, performs a data access using the physical memory address 142AAA read from the L2P cache 122. For example, performing the data access includes reading the physical memory address 142AAA associated with the logical memory address 140AAA from the L2P cache 122 and sending a memory access request that includes the physical memory address 142AAA to the device controller 162.

The device controller 162, in response to receiving the memory access request, performs the memory access (e.g., read or write) at the physical memory address 142AAA. For example, the device controller 162, in response to receiving a read request, reads data at the physical memory address 142AAA and provides the data to the HCI 112. As another example, the device controller 162, in response to receiving a write request, writes data to the physical memory address 142AAA. In a particular aspect, the device controller 162 provides a status (e.g., success or failure) of the memory access request to the HCI 112. In a particular aspect, the HCI 112 provides the data, status, or both, to a component (e.g., the file system) of the host device 102, another device, or both.

According to some implementations, the HCI 112 maintains sub-region access metrics (AMs) 192 of each of the sub-regions 182 and region access metrics 132 of each of the regions 152 stored in the L2P cache 122. According to some implementations, the L2P cache 122 corresponds to a HPB cache and the sub-region access metrics 192 are maintained in a descriptor column of the HPB cache, and the sub-region retention criterion 186 is maintained as an RIR frequency threshold in a control register (e.g., an 8-bit control register). According to some implementations, the sub-region access metrics 192, the region access metrics 132, or both, are associated with a particular time period. For example, the sub-region access metrics 192, the region access metrics 132, or both are associated with a sliding time window. In a particular aspect, the HCI 112 resets the sub-region access metrics 192, the region access metrics 132, or a combination thereof, based on detecting a reset condition, such as expiration of a timer, a reset of the L2P cache 122, receipt of a reset command from the host device 102, or a combination thereof.

In an example, the HCI 112 maintains a sub-region access metric 192AA of the sub-region 182AA, a sub-region access metric 192AB of the sub-region 182AB, and one or more additional access metrics of one or more addition sub-regions 182A of the region 152A. The HCI 112 maintains a region access metric 132A of the region 152A. In a particular implementation, the region access metric 132A is based at least in part on the sub-region access metrics 192A of the sub-regions 182A of the region 152A. As another example, the HCI 112 maintains sub-region access metrics 192C of the sub-regions 182C of the region 152C, and a region access metric 132C of the region 152C. In an example, the L2P cache 122 stores the sub-region access metrics 192 of the sub-regions 182 stored in the L2P cache 122 and the region access metrics 132 of the regions 152 stored in the L2P cache 122. The HCI 112, in response to performing a memory access of the logical memory address 140AAA, updates the sub-region access metric 192AA, the region access metric 132A, or both.

Continuing the previous example, after storing the region 152A into the L2P cache 122, which results in the L2P cache 122 becoming full, the HCI 112 determines that a memory access (e.g., read or write) is to be performed of the logical memory address 140BAA and performs a cache lookup of the logical memory address 140BAA in the L2P cache 122. The HCI 112, in response to detecting a cache miss resulting from the cache lookup in the L2P cache 122 (because the region 152B is not in the L2P cache 122), performs a cache lookup of the logical memory address 140BAA in the cache 124. The HCI 112, in response to detecting a cache miss resulting from the cache lookup in the cache 124, performs a sub-region activation of the sub-region 182BA, as further described with reference to FIG. 4. For example, performing the sub-region activation includes sending an activate request to the device controller 162 to activate the sub-region 182BA that includes the logical memory address 140BAA.

In a particular aspect, the HCI 112 sends the activate request subsequent to making space in the L2P cache 122 in response to determining that the L2P cache 122 is full. For example, making space in the L2P cache 122 includes selecting a region 152 to be removed from the L2P cache 122, selecting a sub-region 182 of the selected region 152 to be retained in the cache 124, copying the selected sub-region 182 to the cache 124, and removing the selected region 152 from the L2P cache 122. To illustrate, the HCI 112 determines that the region 152A is to be removed from the L2P cache 122 based on determining that the region access metric 132A satisfies the region eviction criterion 184, as further described with reference to FIG. 4. The HCI 112 identifies the sub-region 182AA having the sub-region access metric 192AA that satisfies the sub-region retention criterion 186, as further described with reference to FIG. 4.

The HCI 112 stores the sub-region 182AA into the cache 124, and removes the region 152A from the L2P cache 122. In a particular aspect, the HCI 112, in response to determining that the cache 124 is full, selects a sub-region 182 to be removed from the cache 124 and removes the selected sub-region 182 from the cache 124 prior to storing the sub-region 182AA to the cache 124, as further described with reference to FIG. 6. According to some implementations, the HCI 112 maintains sub-region access metrics 192 of each of the sub-regions 182 stored in the cache 124. In a particular aspect, the cache 124 stores the sub-region access metrics 192 of the sub-regions 182 stored in the cache 124.

In an example, the HCI 112 selects a sub-region 182 to be removed from the cache 124 based on determining that a sub-region access metric 192 of the sub-region 182 satisfies the sub-region eviction criterion 188, as further described with reference to FIG. 6. The HCI 112 copies the sub-region 182AA to the cache 124 after removing the selected sub-region 182 from the cache 124. In a particular implementation, the HCI 112, subsequent to adding the sub-region 182AA to the cache 124, updates the sub-region access metric 192AA stored in the cache 124.

The device controller 162, in response to the activate request, retrieves the region 152B (that includes the sub-region 182BA to be activated) from the L2P address mapping table 174 and sends the region 152B to the HCI 112. The HCI 112 stores the region 152B in the L2P cache 122, as further described with reference to FIG. 6. To illustrate, the region 152B (e.g., a replacement region) is stored in the L2P cache 122 after removing the region 152A from the L2P cache 122. In a particular aspect, the HCI 112 updates a region access metric 132 of the region 152B subsequent to adding the region 152B to the L2P cache 122. The HCI 112, after storing the region 152B in the L2P cache 122, performs a cache lookup of the logical memory address 140BAA in the L2P cache 122.

The HCI 112, in response to a cache hit resulting from the cache lookup in the L2P cache 122, reads a physical memory address 142BAA associated with the logical memory address 140BAA from the L2P cache 122 and performs a data access using the physical memory address 142BAA. For example, performing the data access includes sending a memory access request that includes the physical memory address 142BAA to the device controller 162. The device controller 162, in response to receiving the memory access request, performs the memory access (e.g., read or write) at the physical memory address 142BAA. According to some implementations, the HCI 112, in response to performing the memory access of the logical memory address 140BAA, updates a sub-region access metric 192 of the sub-region 182BA, a region access metric 132 of the region 152B, or both, stored at the L2P cache 122.

Continuing the previous example, after evicting the region 152A and storing the region 152B into the L2P cache 122 (which is full), along with storing the sub-region 182AA to the cache 124, the HCI 112 determines that a memory access (e.g., read or write) is to be performed of the logical memory address 140AAB and performs a cache lookup of the logical memory address 140AAB in the L2P cache 122. The HCI 112, in response to detecting a cache miss resulting from the cache lookup in the L2P cache 122, performs a cache lookup of the logical memory address 140AAB in the cache 124. The HCI 112, in response to detecting a match of the logical memory address 140AAB to the logical addresses (e.g., a logical address range) of the sub-region 182AA stored in the cache 124, detects a cache hit resulting from the cache lookup in the cache 124.

The HCI 112, in response to the cache hit resulting from the cache lookup in the cache 124, reads the physical memory address 142AAB associated with the logical memory address 140AAB from the cache 124 and performs a data access using the logical memory address 140AAB. For example, performing the data access includes sending the physical memory address 142AAB to the device controller 162 in conjunction with a memory access request to access the data stored at the physical memory address 142AAB of the flash memory 164. The device controller 162, in response to receiving the memory access request, performs the memory access (e.g., read or write) at the physical memory address 142AAB. According to some implementations, the HCI 112, in response to performing the memory access of the logical memory address 140AAB, updates the sub-region access metric 192AA of the sub-region 182AA stored in the cache 124.

According to some implementations, the device controller 162 is configured to notify the HCI 112 that a region 152 is to be inactivated, a sub-region 182 is to be activated, or both, as further described with reference to FIGS. 7-9. The HCI 112, in response to a notification from the HCI 112, determines that the region 152 is to be removed, that the sub-region 182 is to be activated, or both. According to some implementations, the device controller 162 is configured to notify the HCI 112 that a sub-region 182 is to be updated, as further described with reference to FIGS. 10-11. The HCI 112, in response to a notification from the HCI 112, determines that the sub-region 182 is to be updated.

The sub-region 182AA, which was copied to the cache 124 in the above example, remains available at the host device 102 in the cache 124 subsequent to the eviction of the region 152A from the L2P cache 122. The system 100 thus reduces memory access latency associated with accessing memory address mappings of logical memory addresses included in the sub-region 182AA subsequent to eviction of the region 152A from the L2P cache 122.

It should be understood that the particular order of operations in the above example(s), or in other examples described herein, is provided for purposes of illustration and not of limitation. In other examples, two or more operations can be performed in another order. To illustrate, the HCI 112 evicting the region 152A prior to sending the activation request to activate the sub-region 182BA is provided as an illustrative example; in other examples, the HCI 112 can send the activation request prior to evicting the region 152A.

Figure 2:
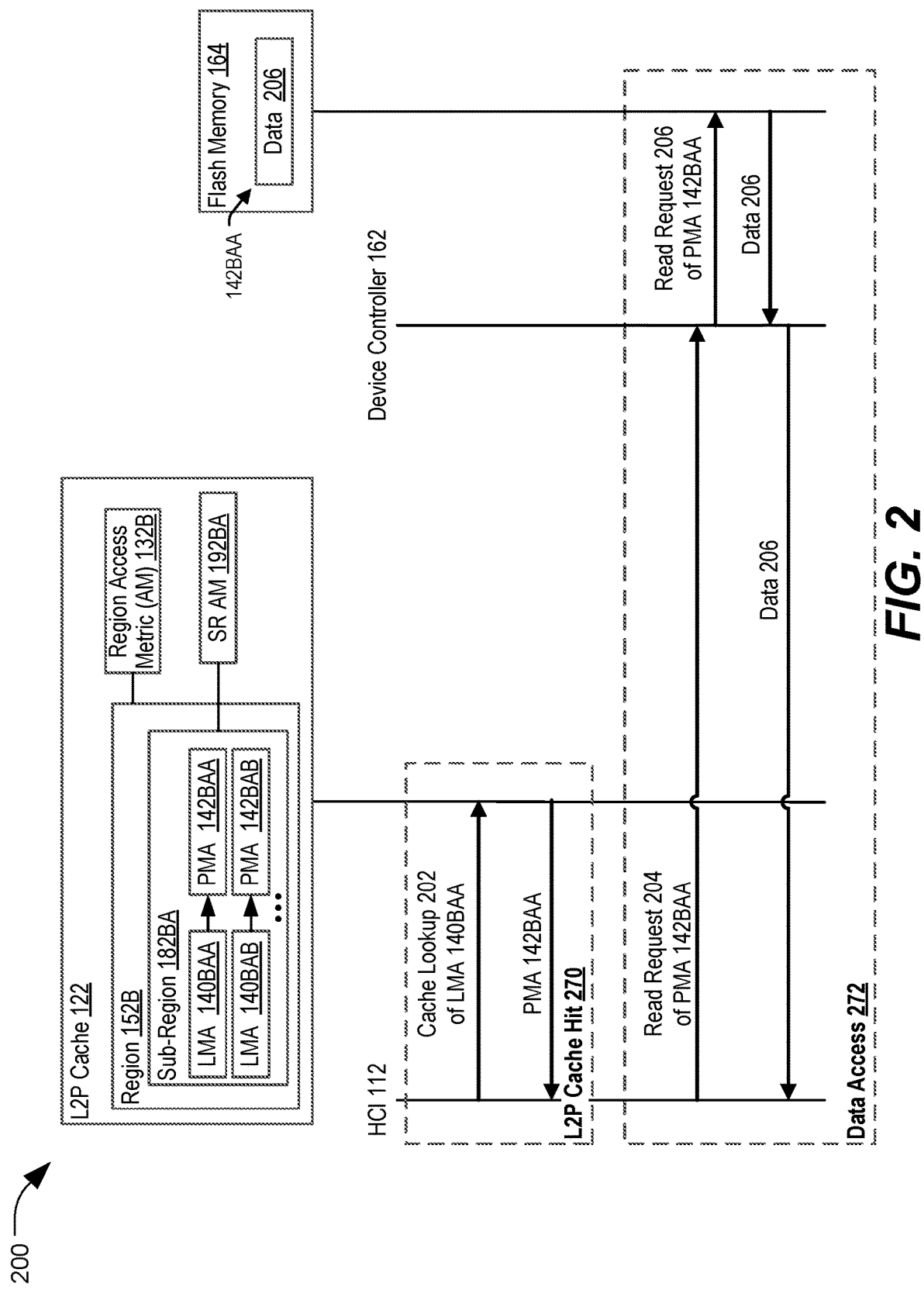
FIG. 2 is a ladder diagram of an illustrative aspect of operations associated with host device caching of address mappings of a flash memory device, in accordance with some examples of the present disclosure.

FIG. 2 is a ladder diagram of an illustrative aspect of operations 200 associated with host device caching of address mappings of a flash memory device, in accordance with some examples of the present disclosure. In a particular aspect, one or more of the operations 200 are performed by the HCI 112, the L2P cache 122, the host device 102, the device controller 162, the flash memory 164, the flash memory device 104, the system 100 of FIG. 1, or a combination thereof.

In the example illustrated in FIG. 2, a memory access is to be performed of the logical memory address 140BAA included in the sub-region 182BA of the region 152B, and the region 152B is stored in the L2P cache 122. The operations 200 include a L2P cache hit 270 followed by a data access 272. The L2P cache hit 270 includes the HCI 112 performing a cache lookup 202 of the logical memory address 140BAA in the L2P cache 122. The HCI 112 detects a cache hit in response to determining that the logical memory address 140BAA matches (e.g., is included in) the logical memory addresses 140BA of the sub-region 182BA of the region 152B stored in the L2P cache 122. The HCI 112, in response to detecting the cache hit, reads the physical memory address 142BAA associated with the logical memory address 140BAA from the L2P cache 122.

The data access 272 includes the HCI 112 performing a memory access at the physical memory address 142BAA of the flash memory 164. For example, the HCI 112 sends the physical memory address 142BAA in conjunction with a read request 204 to the device controller 162. The device controller 162, in response to receiving the read request 204 indicating the physical memory address 142BAA, performs a read of data 206 from the physical memory address 142BAA at the flash memory 164. The device controller 162 provides the data 206 to the HCI 112.

In a particular implementation, the HCI 112, in response to performing the memory access, updates a sub-region access metric 192BA of the sub-region 182BA, a region access metric 132B of the region 152B, or both. In a particular implementation, the sub-region access metric 192BA indicates a count of memory accesses to the sub-region 182BA during a particular time period and the HCI 112 updates (e.g., increments by 1) the count of memory accesses to the sub-region 182BA. In a particular implementation, the region access metric 132B indicates a count of memory accesses to the region 152B during a particular time period and the HCI 112 updates (e.g., increments by 1) the count of memory accesses to the region 152B.

In a particular implementation, the sub-region access metric 192BA indicates a time of a most recent memory access of the sub-region 182BA, and the HCI 112 updates the sub-region access metric 192BA at a first time to indicate a sub-region memory access time associated with the most recent memory access to the sub-region 182BA. In some aspects, the sub-region memory access time includes the first time, a memory access time received from the device controller 162, a receipt time of a notification from the device controller 162, or a combination thereof. In a particular implementation, the region access metric 132B indicates a time of a most recent memory access of the region 152B, and the HCI 112 updates the region access metric 132B to indicate the sub-region memory access time. In a particular aspect, the sub-region access metric 192BA, the region access metric 132B, or both, are stored in the L2P cache 122. In a particular aspect, the HCI 112 provides the data 206 to a component of the host device 102, another device, or both.

The operations 200 thus enable the HCI 112 to, in response to a cache hit resulting from the cache lookup 202 in the L2P cache 122, retrieve the physical memory address 142BAA from the L2P cache 122 instead of requesting a mapping of the logical memory address 140BAA from the device controller 162. The HCI 112 also updates the sub-region access metric 192BA and the region access metric 132B. A technical advantage of retrieving the physical memory address 142BAA from the L2P cache 122 can include reducing a read latency associated with reading the data 206 from the physical memory address 142BAA, as compared to requesting a mapping of the logical memory address 140BAA from the device controller 162 prior to sending the read request 204 to the device controller 162. A technical advantage of maintaining the access metrics can include using the access metrics to eviction and retention decision to reduce a likelihood of cache misses.

Figure 3:
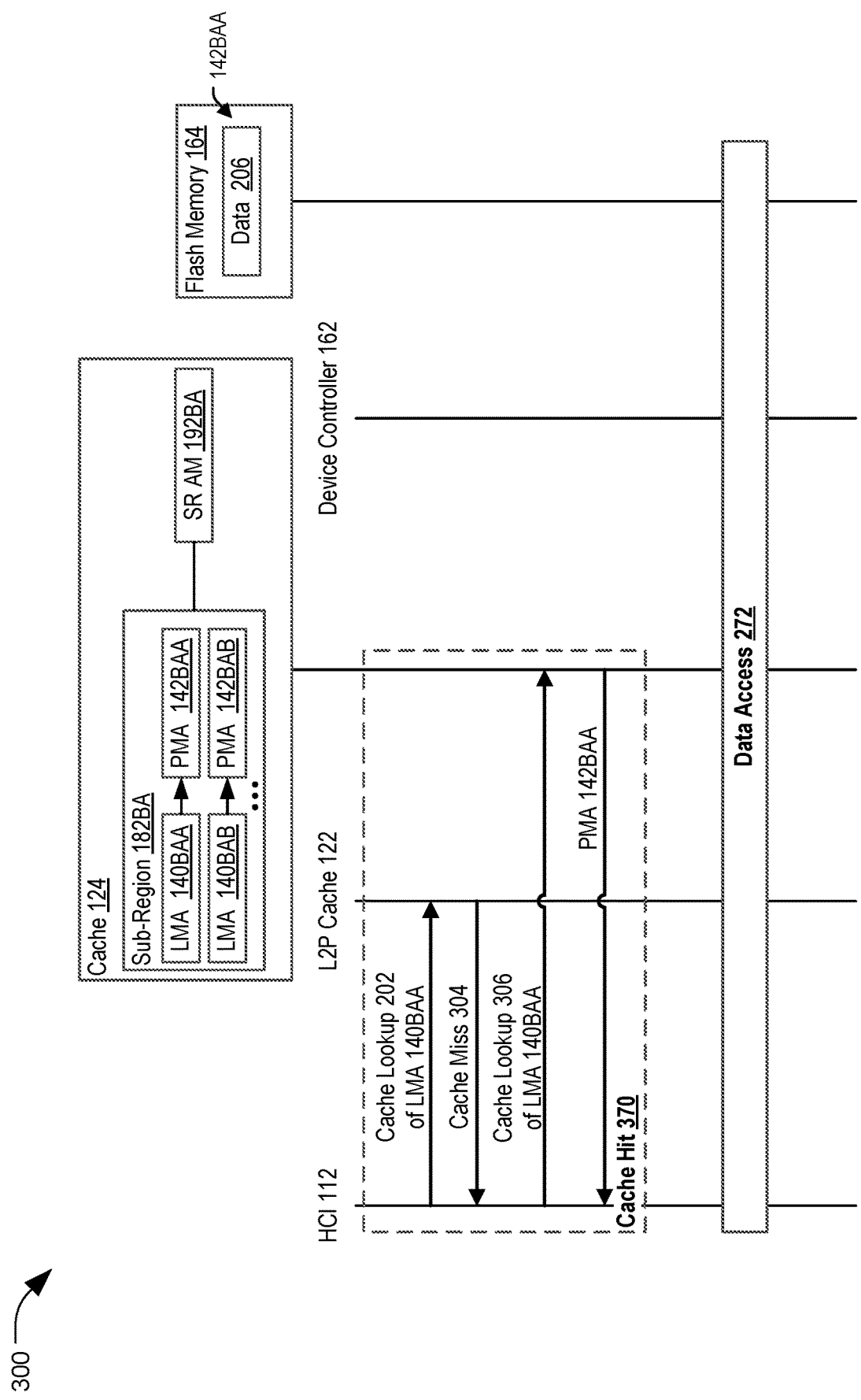
FIG. 3 is a ladder diagram of another illustrative aspect of operations associated with host device caching of address mappings of a flash memory device, in accordance with some examples of the present disclosure.

FIG. 3 is a ladder diagram of an illustrative aspect of operations 300 associated with host device caching of address mappings of a flash memory device, in accordance with some examples of the present disclosure. In a particular aspect, one or more of the operations 300 are performed by the HCI 112, the L2P cache 122, the cache 124, the host device 102, the device controller 162, the flash memory 164, the flash memory device 104, the system 100 of FIG. 1, or a combination thereof.

In the example illustrated in FIG. 3, a memory access is to be performed of the logical memory address 140BAA included in the sub-region 182BA of the region 152B, the region 152B is not stored in the L2P cache 122, and the sub-region 182BA is stored in the cache 124. The operations 300 include a cache hit 370 prior to the data access 272.

The cache hit 370 includes the HCI 112, in response to determining that the logical memory address 140BAA does not match logical addresses of any of the regions 152 stored in the L2P cache 122, detecting a cache miss 304 resulting from the cache lookup 202 of the logical memory address 140BAA in the L2P cache 122.

The HCI 112, in response to detecting the cache miss 304, performs a cache lookup 306 of the logical memory address 140BAA in the cache 124. The HCI 112 detects a cache hit in response to determining that the logical memory address 140BAA matches (e.g., is included in) the logical memory addresses 140BA of the sub-region 182BA stored in the cache 124. The HCI 112 reads the physical memory address 142BAA associated with the logical memory address 140BAA from the cache 124. The HCI 112 performs the data access 272 of the physical memory address 142BAA, as described with reference to FIG. 2.

The operations 300 thus enable the HCI 112 to, in response to a cache hit resulting from the cache lookup 306 in the cache 124, retrieve the physical memory address 142BAA from the cache 124 instead of requesting a mapping of the logical memory address 140BAA from the device controller 162. A technical advantage of retrieving the physical memory address 142BAA from the cache 124 can include reducing a read latency associated with reading the data 206 from the physical memory address 142BAA, as compared to requesting a mapping of the logical memory address 140BAA from the device controller 162 prior to sending the read request 204 to the device controller 162.

Figure 4:
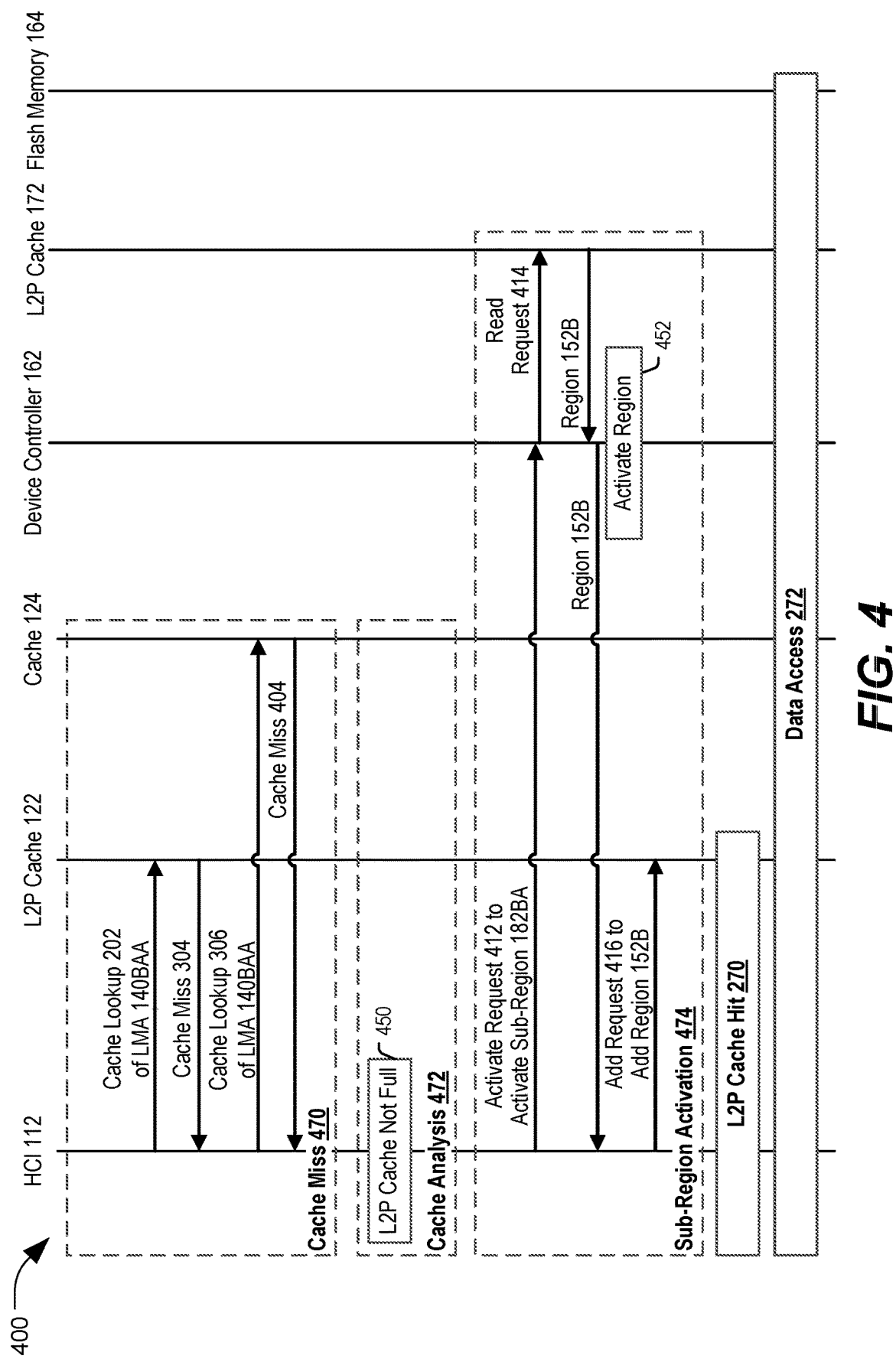
FIG. 4 is a ladder diagram of another illustrative aspect of operations associated with host device caching of address mappings of a flash memory device, in accordance with some examples of the present disclosure.

FIG. 4 is a ladder diagram of an illustrative aspect of operations 400 associated with host device caching of address mappings of a flash memory device, in accordance with some examples of the present disclosure. In a particular aspect, one or more of the operations 400 are performed by the HCI 112, the L2P cache 122, the cache 124, the host device 102, the device controller 162, the L2P cache 172, the flash memory 164, the flash memory device 104, the system 100 of FIG. 1, or a combination thereof.

In the example illustrated in FIG. 4, a memory access is to be performed of the logical memory address 140BAA included in the sub-region 182BA of the region 152B, the region 152B is not stored in the L2P cache 122, the sub-region 182BA is not stored in the cache 124, and the L2P cache 122 is not full. The operations 400 include a cache miss 470, a cache analysis 472, and a sub-region activation 474 prior to the L2P cache hit 270 and the data access 272.

The cache miss 470 includes the HCI 112, in response to determining that the logical memory address 140BAA does not match logical addresses of any of the sub-regions 182 stored in the cache 124, detecting a cache miss 404 resulting from the cache lookup 306 of the logical memory address 140BAA in the cache 124.

The cache analysis 472 includes the HCI 112, at block 450, determining that the L2P cache 122 is not full. For example, the HCI 112 determines that the L2P cache 122 has space available to store at least one region 152. The sub-region activation 474 includes the HCI 112 generating an activate request 412 to activate the sub-region 182BA that includes the logical memory address 140BAA and sending the activate request 412 to the device controller 162. For example, the HCI 112 generates the activate request 412 in response to the cache miss 470 and determining that the L2P cache 122 is not full.

The device controller 162, in response to receiving the activate request 412, sends a read request 414 to the L2P cache 172 to read the region 152B that includes the sub-region 182BA. The device controller 162 retrieves the region 152B from the L2P cache 172 and provides the region 152B to the HCI 112. In a particular implementation, the device controller 162, at block 452, activates the region 152B in response to receiving the activate request 412 from the HCI 112 and receiving the region 152B from the L2P cache 172. For example, the device controller 162 maintains a record of activated regions at the host device 102 and updates the record to indicate that the region 152B is activated.

The HCI 112 provides the region 152B in conjunction with an add request 416 to the L2P cache 122. For example, the HCI 112 stores the region 152B in the L2P cache 122. In a particular aspect, the HCI 112, subsequent to storing the region 152B in the L2P cache 122, updates the region access metric 132B of the region 152B. For example, the region access metric 132 indicates a time at which the region 152B is added to the L2P cache 122.

The operations 400 thus enable the HCI 112 to, in response to the cache miss 470, retrieve the region 152B from the L2P cache 172 to store in the L2P cache 122 instead of requesting a mapping of the logical memory address 140BAA from the device controller 162. A technical advantage of retrieving the entire region instead of the mapping of a single logical memory address can include reducing a read latency associated with subsequent memory accesses of logical addresses included in the region.

Figure 5:
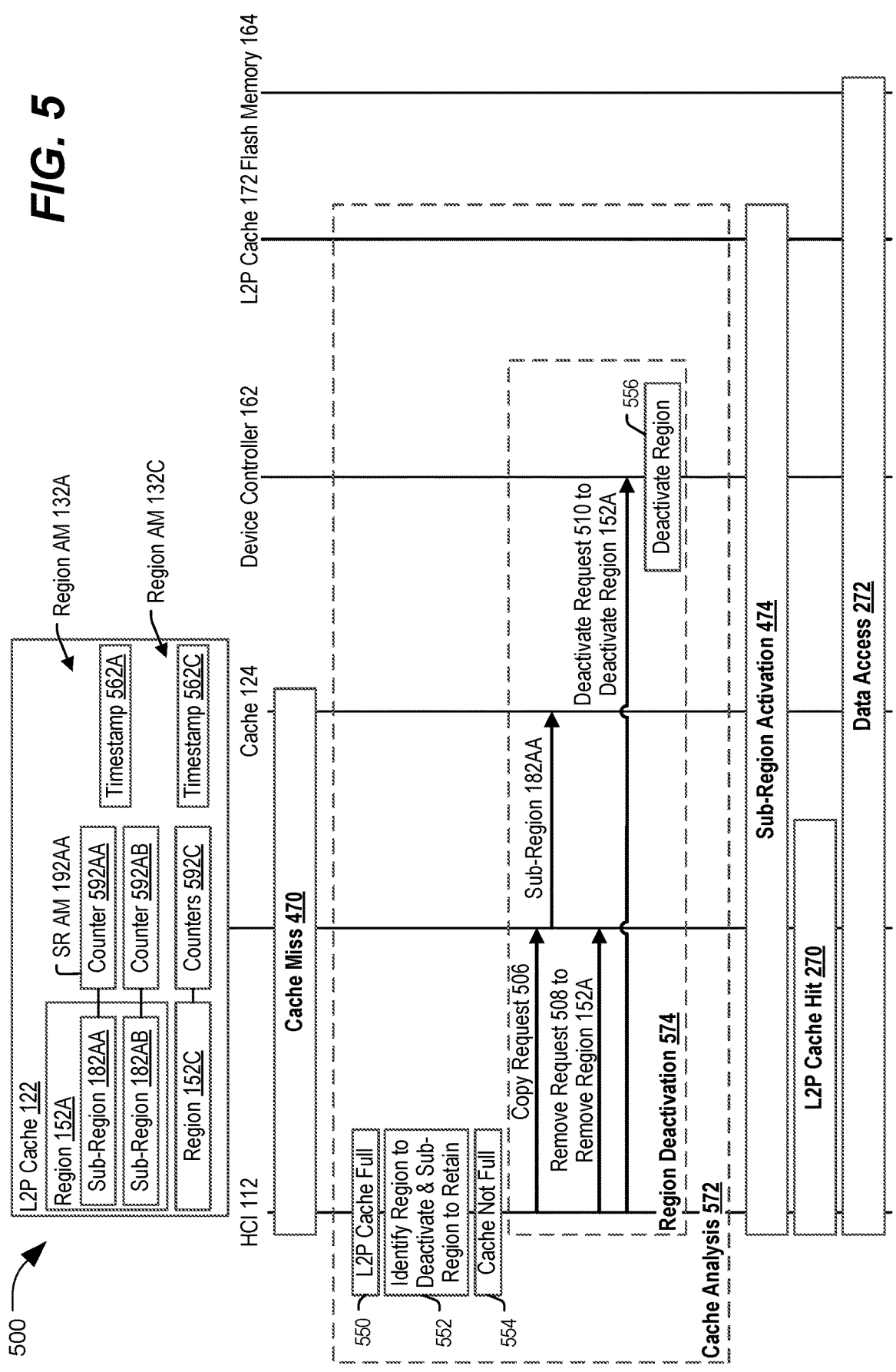
FIG. 5 is a ladder diagram of another illustrative aspect of operations associated with host device caching of address mappings of a flash memory device, in accordance with some examples of the present disclosure.

FIG. 5 is a ladder diagram of an illustrative aspect of operations 500 associated with host device caching of address mappings of a flash memory device, in accordance with some examples of the present disclosure. In a particular aspect, one or more of the operations 500 are performed by the HCI 112, the L2P cache 122, the cache 124, the host device 102, the device controller 162, the L2P cache 172, the flash memory 164, the flash memory device 104, the system 100 of FIG. 1, or a combination thereof.

In the example illustrated in FIG. 5, a memory access is to be performed of the logical memory address 140BAA included in the sub-region 182BA of the region 152B, the region 152B is not stored in the L2P cache 122, the sub-region 182BA is not stored in the cache 124, the L2P cache 122 is full, and the cache 124 is not full. The operations 500 include a cache analysis 572 subsequent to the cache miss 470 and prior to the sub-region activation 474, the L2P cache hit 270, and the data access 272.

The cache analysis 572 includes the HCI 112, at block 550, determining that the L2P cache 122 is full. For example, the HCI 112 determines that available space of the L2P cache 122 is less than a size of a region 152. The HCI 112, in response to the cache miss 470 and determining that the L2P cache 122 is full, makes space in the L2P cache 122 prior to sending the activate request 412 to the device controller 162. For example, the HCI 112, at block 552, identifies a region to deactivate (e.g., remove from the L2P cache 122) and identifies a sub-region of the identified region to retain in the cache 124. To illustrate, the HCI 112 selects the region 152A to deactivate based on determining that the region access metric 132A of the region 152A satisfies the region eviction criterion 184, and selects the sub-region 182AA of the region 152A based on determining that a sub-region access metric 192AA of the sub-region 182AA satisfies the sub-region retention criterion 186.

In a particular implementation, the region access metric 132A of the region 152A is based on a timestamp 562A, sub-region access metrics 192A of the sub-regions 182A, or a combination thereof. In a particular aspect, a sub-region access metric 192 of a sub-region 182 includes a counter 592 that indicates a total count of memory accesses to logical memory addresses of the sub-region 182. For example, the sub-region access metric 192AA includes a counter 592AA that indicates a total count of memory accesses to logical memory addresses of the sub-region 182AA. As another example, the sub-region access metric 192AB includes a counter 592AB that indicates a total count of memory accesses to logical memory addresses of the sub-region 182AB.

In a particular aspect, the region access metric 132A indicates a total count of memory accesses to logical memory addresses of the region 152A. For example, the total count of memory accesses to logical memory addresses of the region 152A correspond to a sum of the total counts of memory accesses to logical memory addresses of the sub-regions 182A.

In a particular aspect, the timestamp 562A indicates a time at which the region 152A is added to the L2P cache 122, a most recent memory access to any logical memory address of the region 152A, or both. In an example, a sub-region access metric 192 of a sub-region 182 includes a timestamp that indicates a sub-region memory access time of a most recent memory access to any logical memory address of the sub-region 182. For example, the sub-region access metric 192AA includes a timestamp (not shown in FIG. 5) that indicates a first sub-region memory access time of a most recent memory access to any logical memory address of the sub-region 182AA. As another example, the sub-region access metric 192AB includes a timestamp that indicates a second sub-region memory access time of a most recent memory access to any logical memory address of the sub-region 182AB. In a particular aspect, the timestamp 562A of the region access metric 132A indicates a most recent time of the sub-region memory access times indicated by the sub-region access metrics 192A.

In a particular aspect, the region access metric 132A of the region 152A is stored in the L2P cache 122. Similarly, in some aspects, one or more additional regions 152 and corresponding region access metrics 132 are stored in the L2P cache 122. For example, the region 152C and a region access metric 132C (e.g., counters 592C, a timestamp 562C, or both) of the region 152C are stored in the L2P cache 122.

According to some implementations, the HCI 112 determines that the region access metric 132A of the region 152A satisfies the region eviction criterion 184 based at least in part on a comparison of the region access metric 132A and one or more thresholds. For example, the HCI 112 determines that the region access metric 132A of the region 152A satisfies the region eviction criterion 184 based at least in part on determining that the total count of memory accesses (indicated by the counters 592A) of the region 152A is less than an access count threshold, that the timestamp 562A indicates an add time (that the region 152A is added to the L2P cache 122) that is earlier than an add time threshold, that the timestamp 562A indicates a most recent memory access time of the region 152A that is earlier than an access time threshold, or a combination thereof.

According to some implementations, the HCI 112 determines that the region access metric 132A of the region 152A satisfies the region eviction criterion 184 based at least in part on a comparison of the region access metric 132A of the region 152A to the region access metrics 132 of other regions 152 stored in the L2P cache 122. For example, the HCI 112 determines that the region access metric 132A of the region 152A satisfies the region eviction criterion 184 based at least in part on determining that the counters 592A indicate (e.g., a sum of the counter values has a lowest value indicating) the least count of accesses among counts of accesses indicated by the counters 592 of each of the regions 152 stored in the L2P cache 122. As another example, the HCI 112 determines that the region access metric 132A of the region 152A satisfies the region eviction criterion 184 based at least in part on determining that the timestamp 562A indicates an add time that is earliest among add times indicated by timestamps 562 of the regions 152 stored in the L2P cache 122. As yet another example, the HCI 112 determines that the region access metric 132A of the region 152A satisfies the region eviction criterion 184 based at least in part on determining that the timestamp 562A indicates a most recent access time that is earliest among most recent access times indicated by the timestamps 562 of the regions 152 stored in the L2P cache 122.

The HCI 112, in response to determining that the region 152A is selected to be deactivated, selects the sub-region 182AA of the region 152A based on determining that a sub-region access metric 192AA of the sub-region 182AA satisfies the sub-region retention criterion 186. According to some implementations, the HCI 112, based at least in part on determining that the sub-region access metric 192AA (e.g., a count of accesses indicated by the counter 592AA) exceeds an access count threshold, determines that the sub-region access metric 192AA satisfies the sub-region retention criterion 186. According to some implementations, the HCI 112, based at least in part on determining that the sub-region access metric 192AA (e.g., a count of accesses indicated by the counter 592AA) has a highest access count value (e.g., highest counter value) among the access count values indicated by the sub-region access metrics 192A of other sub-regions 182A of the region 152A, determines that the sub-region access metric 192AA satisfies the sub-region retention criterion 186.

According to some implementations, the HCI 112, based at least in part on determining that the sub-region access metric 192AA exceeds an access time threshold, determines that the sub-region access metric 192AA satisfies the sub-region retention criterion 186. For example, the HCI 112, based at least in part on determining that the sub-region access metric 192AA (e.g., a timestamp) indicates a most recent memory access time to any logical memory address of the sub-region 182AA that is later than an access time threshold (e.g., indicating that an address in the sub-region 182AA was used more recently than a time indicated by the access time threshold), determines that the sub-region access metric 192AA satisfies the sub-region retention criterion 186.

According to some implementations, the HCI 112, based at least in part on a comparison of an access time indicated by the sub-region access metric 192AA and access times indicated by sub-region access metrics 192A of other sub-regions 182A of the region 152A, determines that the sub-region access metric 192AA satisfies the sub-region retention criterion 186. For example, the HCI 112, based at least in part on determining that the sub-region access metric 192AA (e.g., a timestamp) indicates a most recent memory access time to any logical memory address of the sub-region 182AA that is later than most recent memory access times indicated by the sub-region access metrics 192A of other sub-regions 182A, determines that the sub-region access metric 192AA satisfies the sub-region retention criterion 186.

The HCI 112 determines, at block 554, that the cache 124 is not full. For example, the HCI 112, in response to determining that the cache 124 has space to store at least one sub-region, determines that the cache 124 is not full. The HCI 112, in response to determining that the cache 124 is not full, performs region deactivation 574 to deactivate the region 152A. Performing the region deactivation 574 includes sending a copy request 506 to the L2P cache 122 to copy the sub-region 182AA from the L2P cache 122 to the cache 124. The HCI 112 sends a remove request 508 to the L2P cache 122 to remove the region 152A from the L2P cache 122.

According to some implementations, the HCI 112 sends a deactivate request 510 to the device controller 162 to deactivate the region 152A. The device controller 162, at block 556, deactivates the region 152A in response to receiving the deactivate request 510. For example, the device controller 162 updates activation data to indicate that the region 152A is deactivated. The HCI 112 performs the sub-region activation 474 after removing the region 152A from the L2P cache 122.

The operations 500 thus enable the HCI 112 to, in response to the cache miss 470 and determining that the L2P cache 122 is full, evict the region 152A from the L2P cache 122 based on the region access metric 132A of the region 152A to reduce a likelihood of cache misses in the L2P cache 122. The HCI 112 retains the sub-region 182AA of the region 152A in the cache 124. A technical advantage of retaining the sub-region 182AA in the cache 124 can include reducing a read latency associated with reading from logical memory addresses of the sub-region 182AA after evicting the region 152A from the L2P cache 122.

Figure 6:
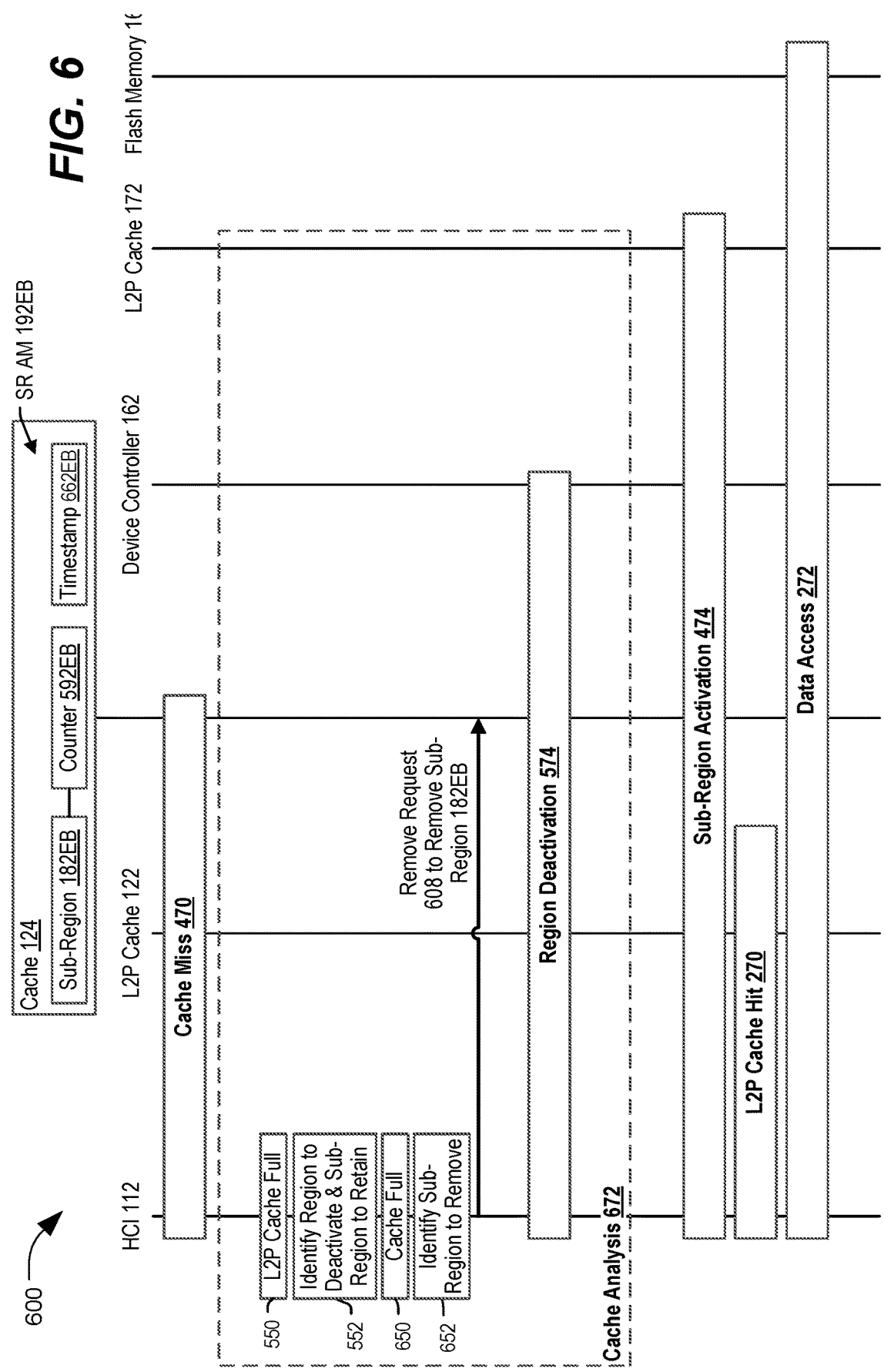
FIG. 6 is a ladder diagram of another illustrative aspect of operations associated with host device caching of address mappings of a flash memory device, in accordance with some examples of the present disclosure.

FIG. 6 is a ladder diagram of an illustrative aspect of operations 600 associated with host device caching of address mappings of a flash memory device, in accordance with some examples of the present disclosure. In a particular aspect, one or more of the operations 600 are performed by the HCI 112, the L2P cache 122, the cache 124, the host device 102, the device controller 162, the L2P cache 172, the flash memory 164, the flash memory device 104, the system 100 of FIG. 1, or a combination thereof.

In the example illustrated in FIG. 6, a memory access is to be performed of the logical memory address 140BAA included in the sub-region 182BA of the region 152B, the region 152B is not stored in the L2P cache 122, the sub-region 182BA is not stored in the cache 124, the L2P cache 122 is full, and the cache 124 is full. The operations 600 include a cache analysis 672 subsequent to the cache miss 470 and prior to the sub-region activation 474, the L2P cache hit 270, and the data access 272.

The cache analysis 672 includes the HCI 112, at block 650, determining that the cache 124 is full. For example, the HCI 112, in response to determining that an available space of the cache 124 is less than a size of a sub-region 182, determines that the cache 124 is full. The HCI 112, in response to the cache miss 470, determining that the L2P cache 122 is full, and that the cache 124 is full, makes space in the cache 124 to make space in the L2P cache 122 prior to sending the activate request 412 to the device controller

162. For examples, the HCI 112, at block 652, identifies a sub-region 182 to remove from the cache 124. To illustrate, the HCI 112 selects a sub-region 182EB stored in the cache 124 in response to determining that a sub-region access metric 192EB of the sub-region 182EB satisfies the sub-region eviction criterion 188.

In an example, the sub-region access metric 192EB is based on a counter 592EB, a timestamp 662EB, or both. In a particular implementation, the counter 592EB indicates a total count of memory accesses to logical memory addresses of the sub-region 182EB during a particular time period. In a particular implementation, the timestamp 662EB indicates an add time that the sub-region 182EB is added to (e.g., stored in) the cache 124, an access time of a most recent access to any logical memory address of the sub-region 182EB, or both.

According to some implementations, the HCI 112 determines that the sub-region access metric 192EB satisfies the sub-region eviction criterion 188 based on a comparison of the sub-region access metric 192EB to one or more thresholds. For example, the HCI 112, based at least in part on determining that the sub-region access metric 192EB (e.g., a count of memory accesses indicated by the counter 592EB) is less than a threshold access count, determines that the sub-region access metric 192EB satisfies the sub-region eviction criterion 188. In another example, the HCI 112, based at least in part on determining that a time indicated by the sub-region access metric 192EB (e.g., the add time, the access time, or both indicated by the timestamp 662EB) is earlier than an access time threshold, determines that the sub-region access metric 192EB satisfies the sub-region eviction criterion 188.

According to some implementations, the HCI 112 determines that the sub-region access metric 192EB of the sub-region 182EB satisfies the sub-region eviction criterion 188 based on a comparison of the sub-region access metric 192EB to sub-region access metrics 192 of other sub-regions 182 stored in the cache 124. For example, the HCI 112, based at least in part on determining that the sub-region access metric 192EB (e.g., a count of accesses indicated by the counter 592EB) has a lowest access count value (e.g., lowest counter value) among the access count values indicated by the sub-region access metrics 192 of other sub-regions 182 stored in the cache 124, determines that the sub-region access metric 192EB satisfies the sub-region eviction criterion 188. As another example, the HCI 112, based at least in part on determining that the sub-region access metric 192EB (e.g., the add time, the access time, or both) indicates an earliest time among the times indicated by the sub-region access metrics 192 of other sub-regions 182 stored in the cache 124, determines that the sub-region access metric 192EB satisfies the sub-region eviction criterion 188. To illustrate, the HCI 112, in response to determining that the sub-region access metric 192EB indicates that the sub-region 182EB is a first sub-region (that has the earliest add time of the sub-regions 182 included in the cache 124) to be added to the cache 124, determines that the sub-region access metric 192EB satisfies the sub-region eviction criterion 188.

The HCI 112, in response to determining that the sub-region access metric 192EB satisfies the sub-region eviction criterion 188, sends a remove request 608 to the cache 124 to remove the sub-region 18EB from the cache 124. The HCI 112 performs the region deactivation 574 after removing the sub-region 18EB from the cache 124.

It should be understood that evicting a single sub-region from the cache 124 is provided as an illustrative example. In other examples, multiple sub-regions 182A of the region 152A may be retained in the cache 124 and one or more sub-regions 182 may be evicted from the cache 124 to make space for one or more of the sub-regions 182A to be retained. For example, the sub-regions 182 stored in the cache 124 may be ranked based on the sub-region access metrics 192 and one or more of the sub-regions 182 may be evicted from the cache 124 based on the rankings.

The operations 600 thus enable the HCI 112 to, in response to the cache miss 470, determining that the L2P cache 122 is full, and determining that the cache 124 is full, evict the sub-region 182EB from the cache 124 based on an access metric to reduce a likelihood of cache misses. The HCI 112 replaces the sub-region 182EB with a sub-region 182AA of the region 152A in the cache 124. A technical advantage of retaining the sub-region 182AA in the cache 124 can include reducing a read latency associated with reading from logical memory addresses of the sub-region 182AA after evicting the region 152A from the L2P cache 122.

Figure 7:
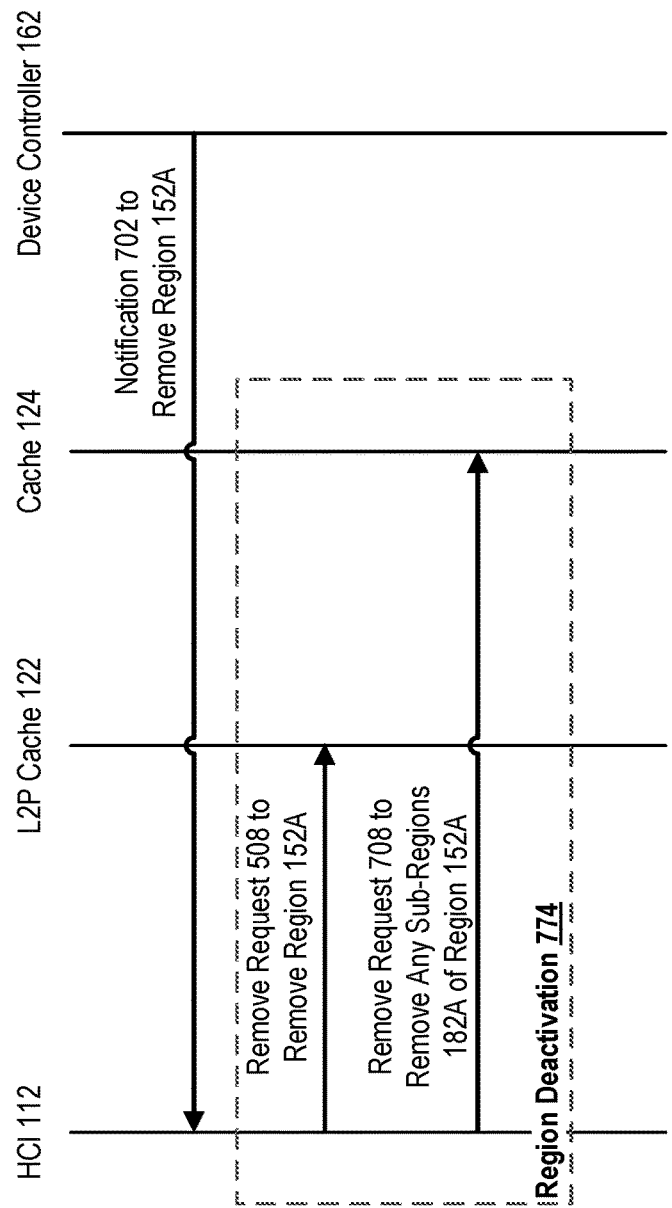
FIG. 7 is a ladder diagram of another illustrative aspect of operations associated with host device caching of address mappings of a flash memory device, in accordance with some examples of the present disclosure.

FIG. 7 is a ladder diagram of an illustrative aspect of operations 700 associated with host device caching of address mappings of a flash memory device, in accordance with some examples of the present disclosure. In a particular aspect, one or more of the operations 700 are performed by the HCI 112, the L2P cache 122, the cache 124, the host device 102, the device controller 162, the flash memory device 104, the system 100 of FIG. 1, or a combination thereof.

The device controller 162 sends a notification 702 to the HCI 112 to inactivate the region 152A. For example, the device controller 162 sends the notification 702 in response to determining that one or more sub-regions 182A of the region 152A have been updated at the flash memory 164. To illustrate, in some examples, multiple sub-regions 182A of the region 152A could be updated due to reshuffling of the data to different physical locations in the flash memory 164. In some examples, sub-region(s) 182 can be updated because one or more logical memory address are deallocated, e.g., due to data deletions.

The HCI 112, in response to receiving the notification 702, performs a region deactivation 774. Performing the region deactivation 774 includes sending the remove request 508 to the L2P cache 122 to remove the region 152A from the L2P cache 122. The L2P cache 122, in response to receiving the remove request 508 and determining that the region 152A is stored at the L2P cache 122, removes the region 152A from the L2P cache 122. The HCI 112 sends a remove request 708 to the cache 124 to remove any sub-regions 182A of the region 152A that are stored in the cache 124. The cache 124, in response to receiving the remove request 708, removes any sub-regions 182A of the region 152A that are stored at the cache 124.

The notification 702 could correspond to the region 152A including one or more invalid (e.g., outdated) mappings. The HCI 112 does not retain any of the sub-regions 182A in the cache 124 during the region deactivation 774 of the region 152A to prevent retaining invalid mappings. The operations 700 thus enable the device controller 162 to remove mappings from the cache 124 in addition to the L2P cache 122.

Figure 8:
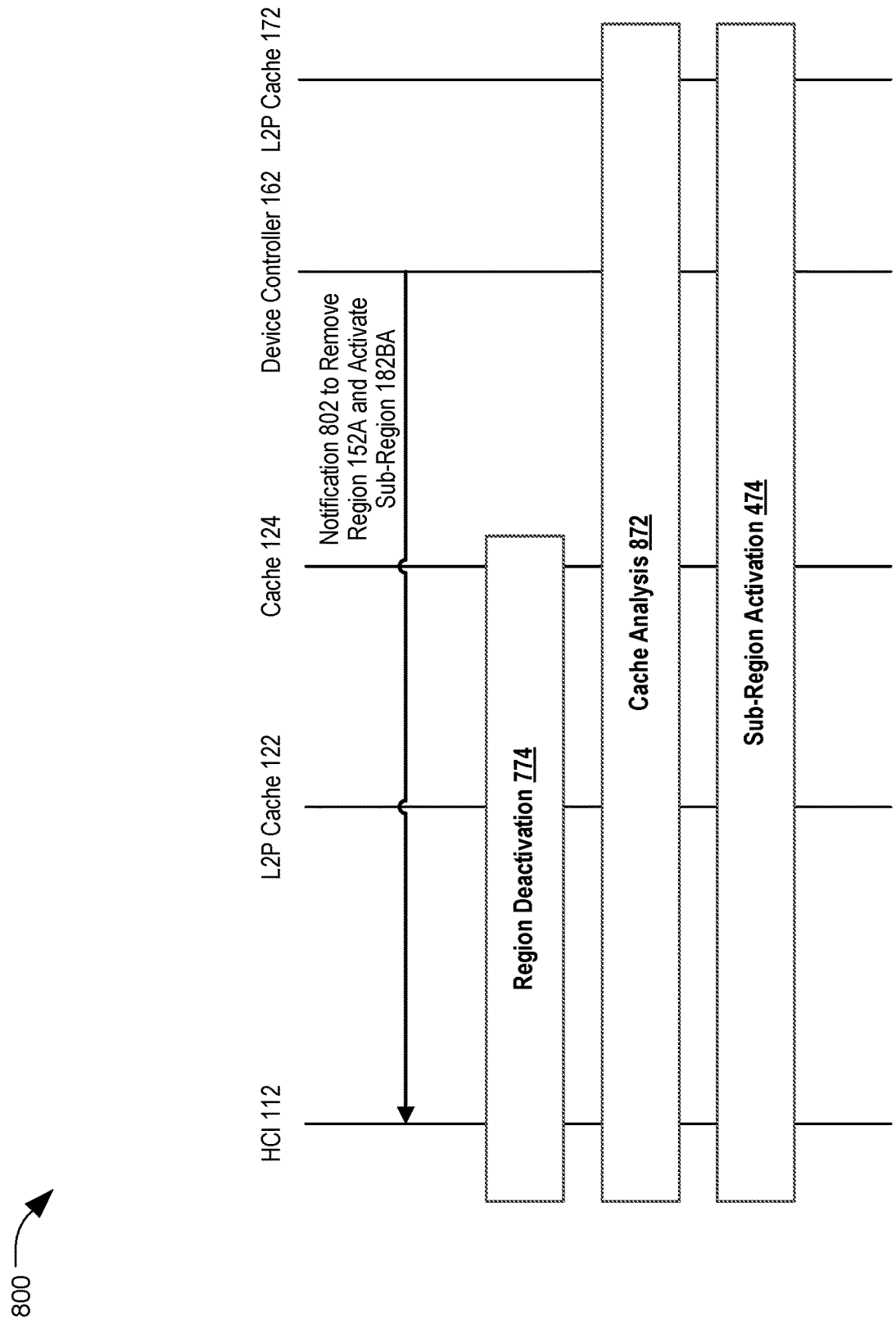
FIG. 8 is a ladder diagram of another illustrative aspect of operations associated with host device caching of address mappings of a flash memory device, in accordance with some examples of the present disclosure.

FIG. 8 is a ladder diagram of an illustrative aspect of operations 800 associated with host device caching of address mappings of a flash memory device, in accordance with some examples of the present disclosure. In a particular aspect, one or more of the operations 800 are performed by the HCI 112, the L2P cache 122, the cache 124, the host device 102, the device controller 162, the L2P cache 172, the flash memory device 104, the system 100 of FIG. 1, or a combination thereof.

The device controller 162 sends a notification 802 to the HCI 112 to inactivate the region 152A and activate the sub-region 182BA. For example, the device controller 162 sends the notification 802 in response to determining that one or more sub-regions 182 of the region 152A have been updated (e.g., moved or deleted) at the flash memory 164, and that the sub-region 182BA is recently added to the flash memory 164.

The HCI 112, in response to receiving the notification 802, performs the region deactivation 774 of the region 152A, as described with reference to FIG. 7. The HCI 112 performs cache analysis 872 after performing the region deactivation 774. The cache analysis 872 corresponds to the cache analysis 472 of FIG. 4 when the L2P cache 122 is not full. The cache analysis 872 corresponds to the cache analysis 572 of FIG. 5 when the L2P cache 122 is full and the cache 124 is not full. The cache analysis 872 corresponds to the cache analysis 672 of FIG. 6 when the L2P cache 122 is full and the cache 124 is full.

Subsequent to the cache analysis 872, the L2P cache 122 includes space for the region 152B that includes the sub-region 182BA. In some examples, a region 152 is evicted from the L2P cache 122 to make space for the region 152B and one or more sub-regions 182 of the evicted region 152 are retained in the cache 124.

The HCI 112, after performing the cache analysis 872, performs the sub-region activation 474 of the sub-region 182BA, as described with reference to FIG. 4. In some implementations, the device controller 162, prior to sending the notification 802 to the HCI 112, updates activation data to indicate that the region 152A is inactivated, the region 152B that includes the sub-region 182BA is activated, or both. The operations 800 thus enable the device controller 162 to remove mappings of the region 152A from the cache 124 in addition to the L2P cache 122, and to store mappings of the region 152B in the L2P cache 122.

Figure 9:
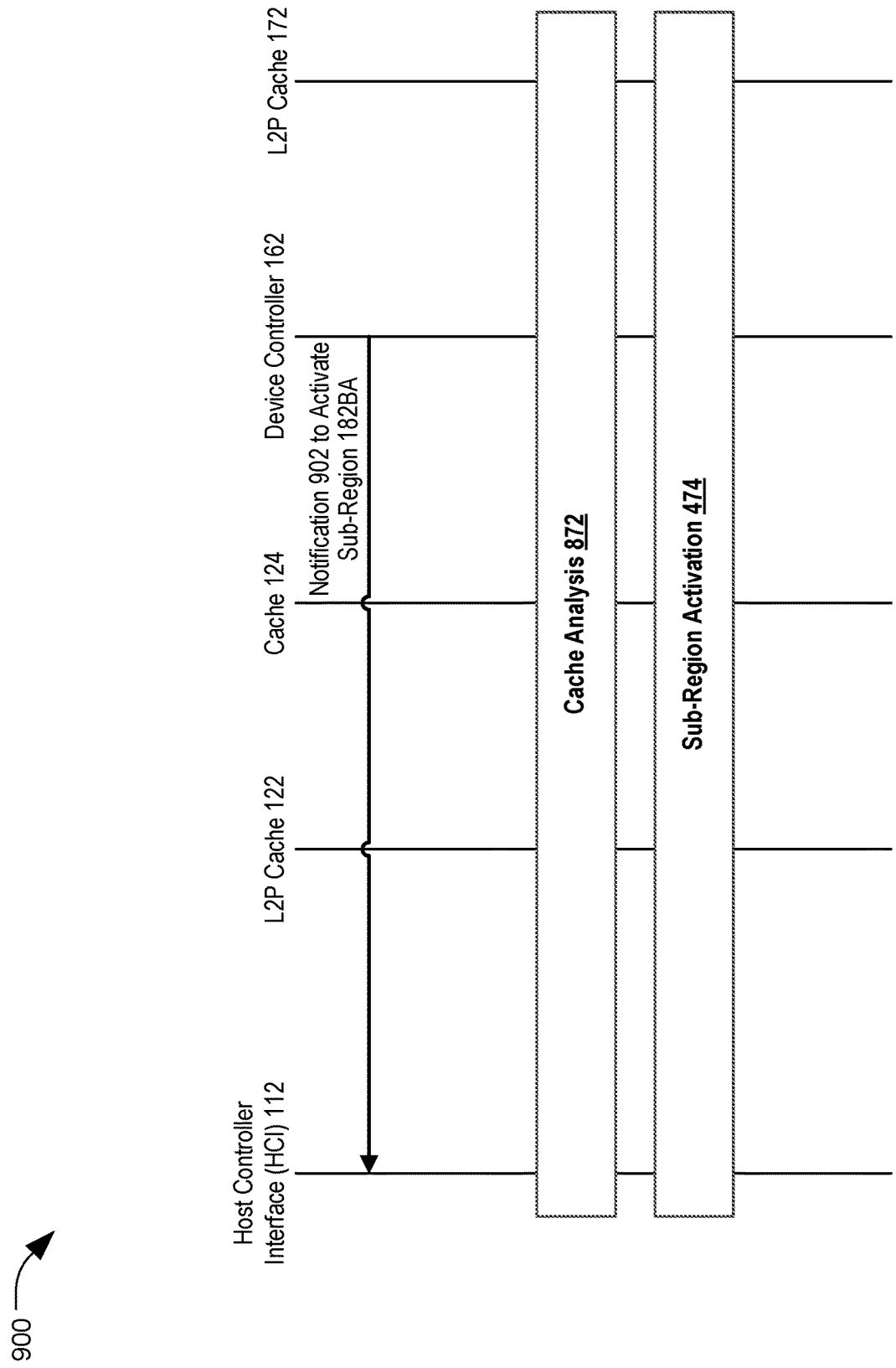
FIG. 9 is a ladder diagram of another illustrative aspect of operations associated with host device caching of address mappings of a flash memory device, in accordance with some examples of the present disclosure.

FIG. 9 is a ladder diagram of an illustrative aspect of operations 900 associated with host device caching of address mappings of a flash memory device, in accordance with some examples of the present disclosure. In a particular aspect, one or more of the operations 900 are performed by the HCI 112, the L2P cache 122, the cache 124, the host device 102, the device controller 162, the L2P cache 172, the flash memory device 104, the system 100 of FIG. 1, or a combination thereof.

The device controller 162 sends a notification 902 to the HCI 112 to activate the sub-region 182BA. For example, the device controller 162 sends the notification 902 in response to determining that the sub-region 182BA is recently added to the flash memory 164.

The HCI 112, in response to receiving the notification 902, performs the cache analysis 872, as described with reference to FIG. 8. Subsequent to the cache analysis 872, the L2P cache 122 includes space for the region 152B that includes the sub-region 182BA. In some examples, a region 152 is evicted from the L2P cache 122 to make space for the region 152B and one or more sub-regions 182 of the evicted region 152 are retained in the cache 124.

The HCI 112, after performing the cache analysis 872, performs the sub-region activation 474 of the sub-region 182BA, as described with reference to FIG. 4. In some implementations, the device controller 162, prior to sending the notification 902 to the HCI 112, updates activation data to indicate that the region 152B that includes the sub-region 182BA is activated. The operations 900 thus enable the device controller 162 to store mappings of the region 152B in the L2P cache 122.

Figure 10:
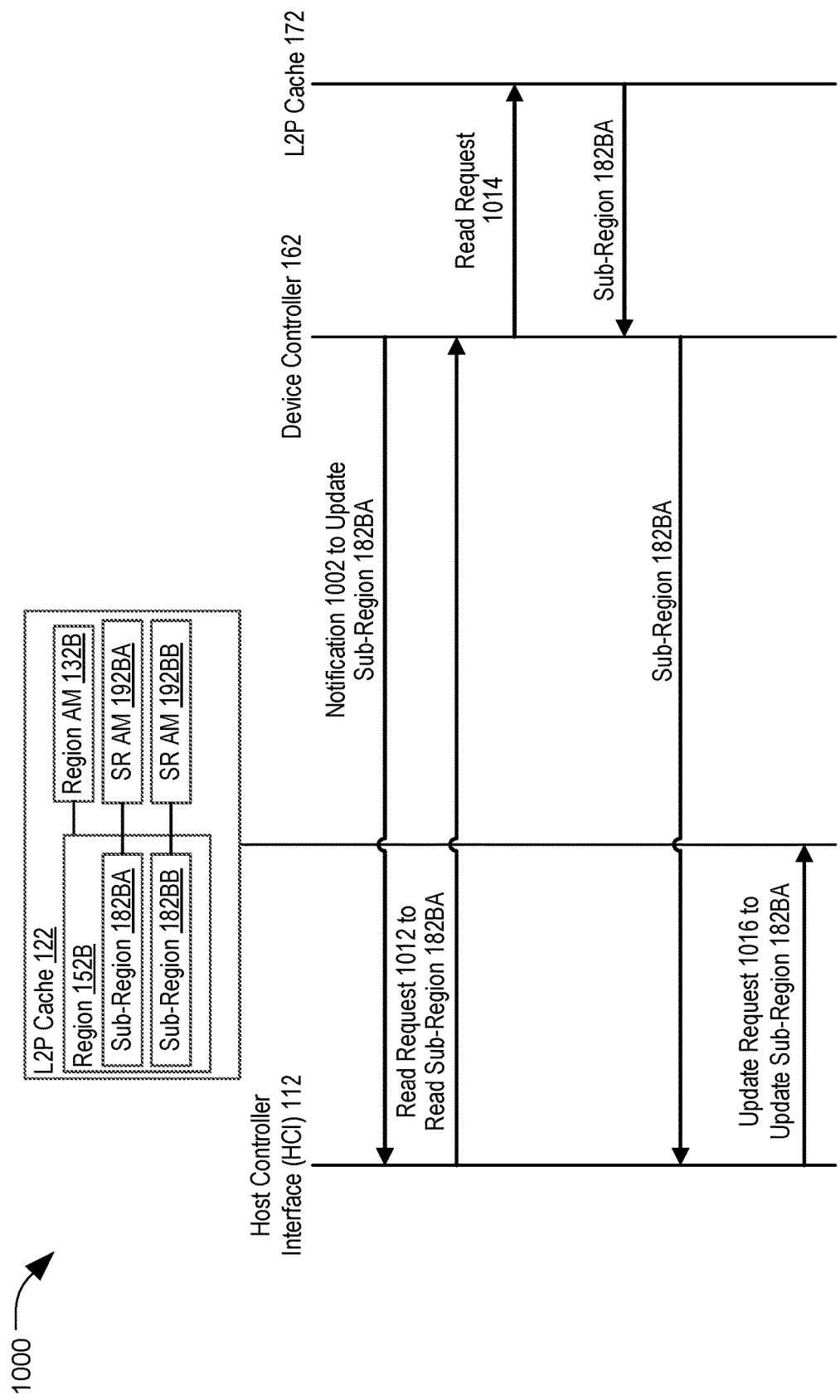
FIG. 10 is a ladder diagram of another illustrative aspect of operations associated with host device caching of address mappings of a flash memory device, in accordance with some examples of the present disclosure.

FIG. 10 is a ladder diagram of an illustrative aspect of operations 1000 associated with host device caching of address mappings of a flash memory device, in accordance with some examples of the present disclosure. In a particular aspect, one or more of the operations 1000 are performed by the HCI 112, the L2P cache 122, the host device 102, the device controller 162, the L2P cache 172, the flash memory device 104, the system 100 of FIG. 1, or a combination thereof.

The device controller 162 sends a notification 1002 to the HCI 112 to update the sub-region 182BA. For example, the device controller 162 sends the notification 1002 in response to determining that one or more mappings of the sub-region 182BA are updated at the L2P cache 172 of the flash memory device 104.

The HCI 112, in response to receiving the notification 1002, sends a read request 1012 to read the sub-region 182BA to the device controller 162. The device controller 162, in response to receiving the read request 1012, sends a read request 1014 to read the sub-region 182BA to the L2P cache 172. For example the device controller 162 reads the sub-region 182BA from the L2P cache 172. The device controller 162 provides the sub-region 182BA to the HCI 112.

The HCI 112 sends an update request 1016 to update the sub-region 182BA to the L2P cache 122. The L2P cache 122, in response to receiving the update request 1016 and determining that the sub-region 182BA is stored in the L2P cache 122, replaces the sub-region 182BA store in the L2P cache 122 with the sub-region 182BA received from the HCI 112 (or the device controller 162). The operations 1000 thus enable the device controller 162 to update mappings of the sub-region 182BA stored in the L2P cache 122.

Figure 11:
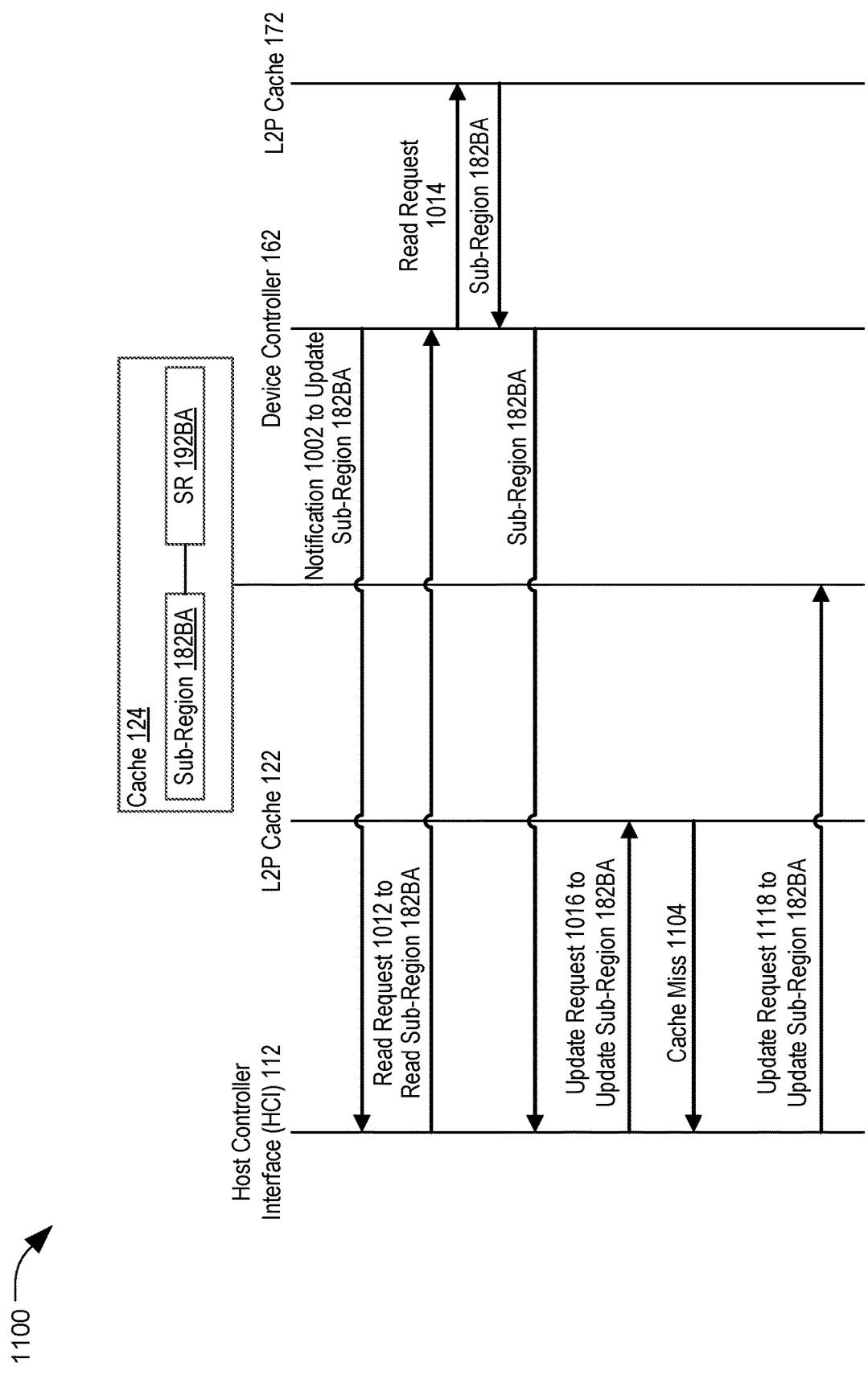
FIG. 11 is a ladder diagram of another illustrative aspect of operations associated with host device caching of address mappings of a flash memory device, in accordance with some examples of the present disclosure.

FIG. 11 is a ladder diagram of an illustrative aspect of operations 1100 associated with host device caching of address mappings of a flash memory device, in accordance with some examples of the present disclosure. In a particular aspect, one or more of the operations 1100 are performed by the HCI 112, the L2P cache 122, the cache 124, the host device 102, the device controller 162, the L2P cache 172, the flash memory device 104, the system 100 of FIG. 1, or a combination thereof.

The L2P cache 122, in response to receiving the update request 1016 and determining that the sub-region 182BA is not stored in the L2P cache 122, provides an indication of a cache miss 1104 to the HCI 112. The HCI 112, in response to detecting the cache miss 1104, sends an update request 1118 to update the sub-region 182BA to the cache 124. The cache 124, in response receiving the update request 1118 and determining that the sub-region 182BA is stored at the cache 124, replaces the sub-region 182BA store at the cache 124 with the sub-region 182BA received from the HCI 112 (or the device controller 162). The operations 1100 thus enable the device controller 162 to update mappings of the sub-region 182BA stored in the cache 124.

Figure 12:
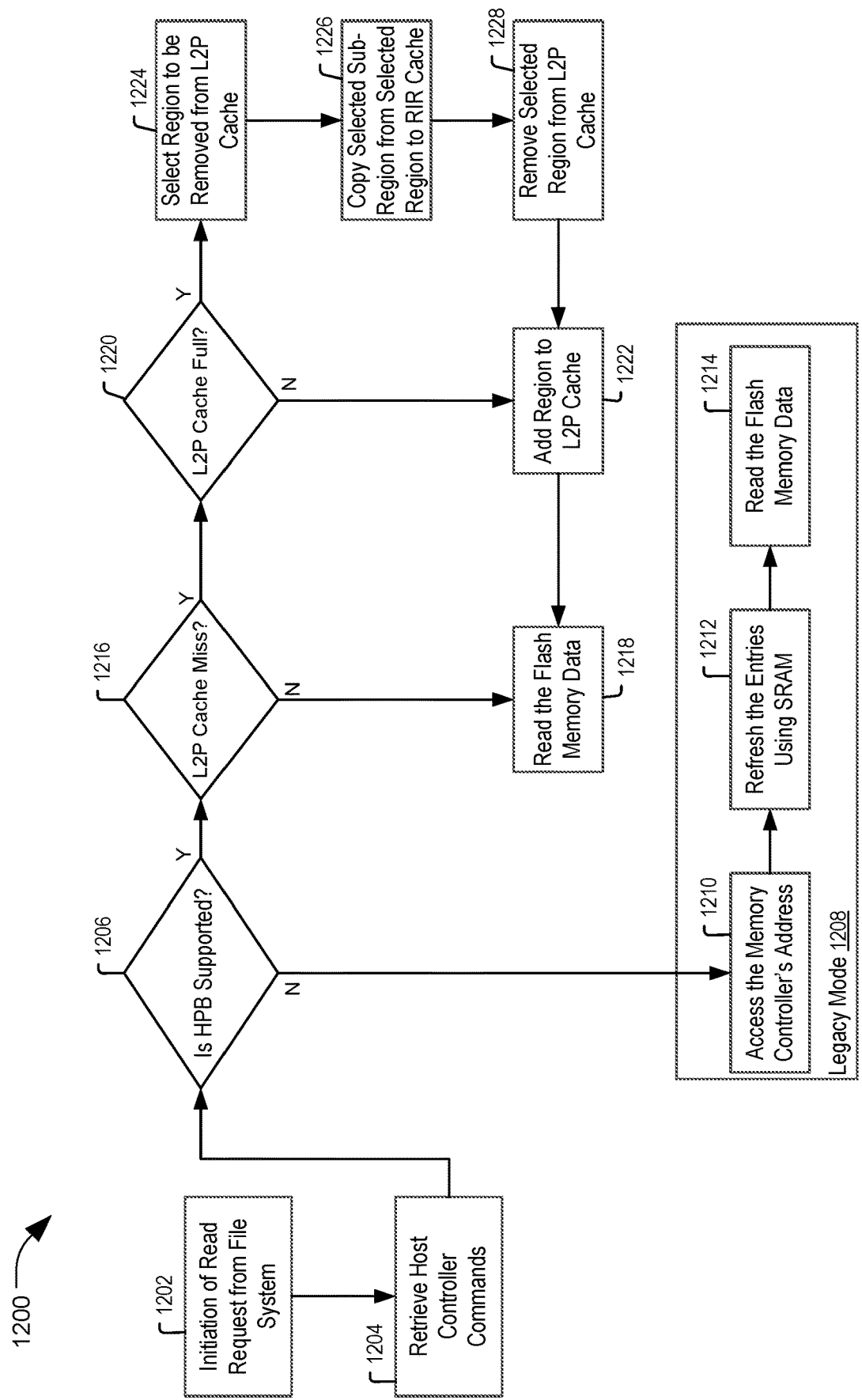
FIG. 12 is a diagram of a particular implementation of a method of host device caching of address mappings of a flash memory device that may be performed by the device of FIG. 1, in accordance with some examples of the present disclosure.

FIG. 12 is a diagram of a particular implementation of a method 1200 of host device caching of address mappings of a flash memory device that may be performed by the device of FIG. 1, in accordance with some examples of the present disclosure. In a particular aspect, one or more of the operations of the method 1200 are performed by the HCI 112, the L2P cache 122, the cache 124, the host device 102, the device controller 162, the L2P cache 172, the device controller 162, the flash memory 164, the flash memory device 104, the system 100 of FIG. 1, or a combination thereof.

The method 1200 includes, at block 1202, initiation of a read request from a file system. For example, the HCI 112 of FIG. 1 receives a memory access request (e.g., a read request) from a file system of the host device 102. In a particular aspect, the memory access request indicates a logical memory address 140BAA of data to be accessed.

The method 1200 also includes, at block 1204, retrieving host controller commands. For example, the HCI 112 retrieves host controller commands that are supported (e.g., activated) at the HCI 112.

The method 1200 further includes, at block 1206, determining whether HPB is supported. For example, the HCI 112 determines whether retrieved host controller commands indicate that HPB is supported at the host device 102 for the flash memory device 104.

The method 1200 includes, in response to determining, at block 1206, that HPB is not supported, performing legacy mode operations 1208. Performing the legacy mode operations 1208 includes accessing, at block 1210, an address of a memory controller. For example, the HCI 112, in response to determining that HPB is not supported, retrieves an address of the device controller 162.

Performing the legacy mode operations 1208 also includes refreshing, at block 1212, entries using SRAM. For example, the HCI 112 sends a mapping request to the device controller 162 to retrieve the physical memory address 142BAA associated with the logical memory address 140BAA from the L2P address mapping table 174 stored in the L2P cache 172 (e.g., SRAM).

Performing the legacy mode operations 1208 further includes reading, at block 1214, the flash memory data. For example, the HCI 112 sends a read request to the device controller 162 for the physical memory address 142BAA and receives the data 206 from the device controller 162 retrieved from the physical memory address 142BAA of the flash memory 164.

The method 1200 includes, in response to determining, at block 1206, that HPB is supported, determining, at block 1216, whether a L2P cache miss is detected. For example, the HCI 112, in response to determining that HPB is supported, performs a cache lookup for the logical memory address 140BAA in the L2P cache 122.

The method 1200 includes, in response to determining, at block 1216, that a L2P cache hit is detected, reading, at block 1218, the flash memory data. For example, the HCI 112, in response to detecting a cache hit resulting from the cache lookup in the L2P cache 122, performs the data access 272, as described with reference to FIG. 2. To illustrate, the HCI 112 sends a read request 204 for the physical memory address 142BAA to the device controller 162 and receives the data 206 from the device controller 162. The data 206 is retrieved from the physical memory address 142BAA of the flash memory 164.

The method 1200 includes, in response to determining, at block 1216, that a L2P cache miss is detected, determining, at block 1220, whether the L2P cache is full. For example, the HCI 112, in response to detecting the cache miss 304, determines whether the L2P cache 122 is full, as described with reference to FIGS. 4 and 5.

The method 1200 includes, in response to determining, at block 1220, that the L2P cache is not full, adding, at block 1222, a region to the L2P cache and proceeding to block 1218. For example, the HCI 112, in response to determining that the L2P cache 122 is not full, performs the sub-region activation 474 and the data access 272, as described with reference to FIG. 4. To illustrate, the HCI 112 adds the region 152B to the L2P cache 122, sends a read request 204 for the physical memory address 142BAA to the device controller 162, and receives the data 206 from the device controller 162.

The method 1200 includes, in response to determining, at block 1220, that the L2P cache is full, selecting, at block 1224, a region to be removed from the L2P cache. For example, the HCI 112, in response to determining that the L2P cache 122 is full, selects the region 152A to be removed from the L2P cache 122, as described with reference to FIG. 5.

The method 1200 also includes copying, at block 1226, a selected sub-region of the selected region to an RIR cache. For example, the HCI 112 copies the sub-region 182AA to the cache 124 (e.g., an RIR cache).

The method 1200 also includes removing, at block 1228, the selected region from the L2P cache and proceeding to the block 1222. For example, the HCI 112 removes the region 152A from the L2P cache 122 and adds the region 152B to the L2P cache 122.

The method 1200 enables the sub-region 182AA to be available in the cache 124 subsequent to eviction of the region 152A from the L2P cache 122. A technical advantage of having the sub-region 182AA in the cache 124 can include reduced memory access latency associated with subsequent memory accesses of logical memory addresses of the sub-region 182AA.

The method 1200 of FIG. 12 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1200 of FIG. 12 may be performed by a processor that executes instructions, such as described with reference to FIG. 14.

Figure 13:
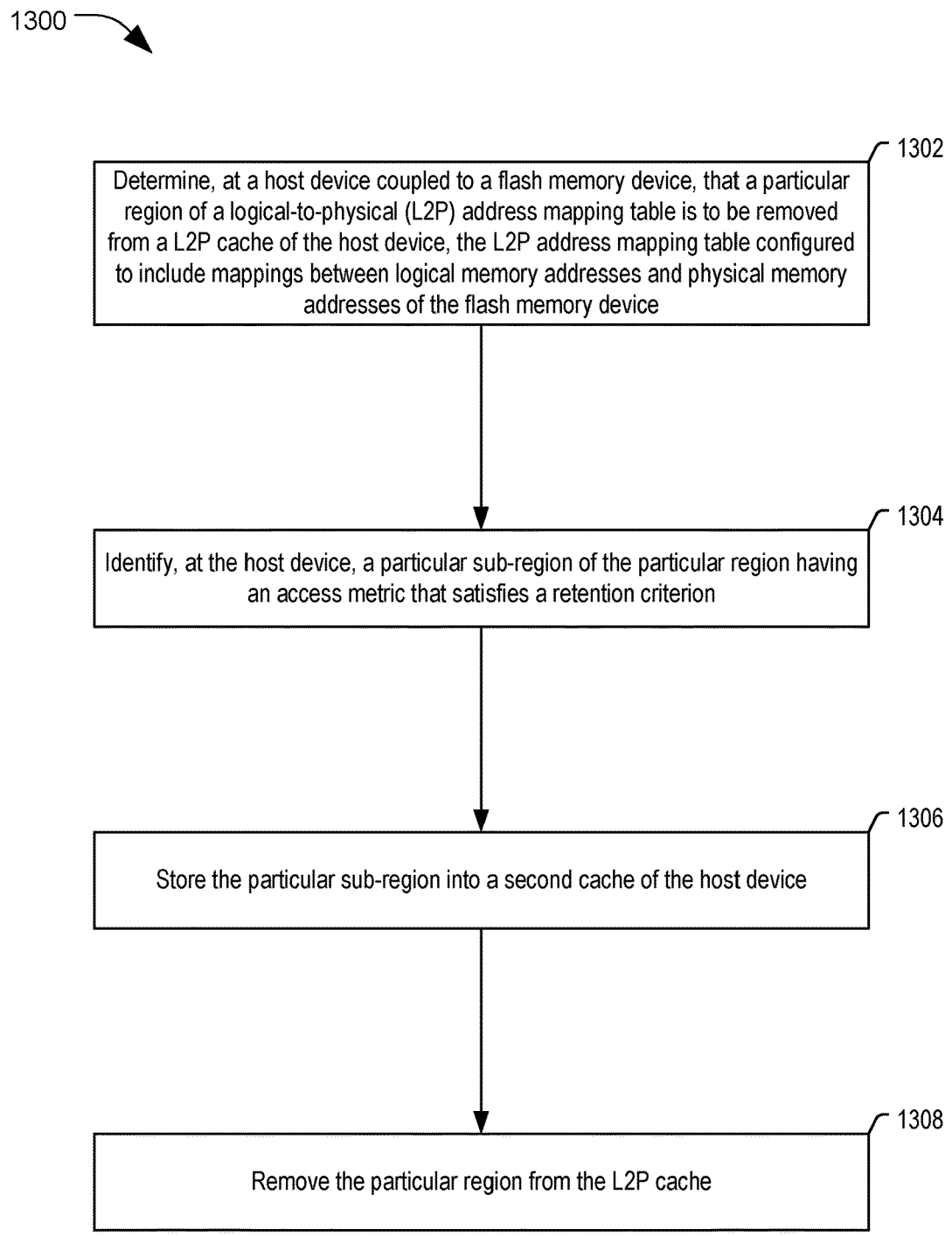
FIG. 13 is a diagram of another particular implementation of a method of host device caching of address mappings of a flash memory device that may be performed by the device of FIG. 1, in accordance with some examples of the present disclosure.

Referring to FIG. 13, a particular implementation of a method 1300 of host device caching of address mappings of a flash memory device is shown. In a particular aspect, one or more operations of the method 1300 are performed by at least one of the HCI 112, the L2P cache 122, the cache 124, the host device 102, the device controller 162, the L2P cache 172, the flash memory 164, the flash memory device 104, the system 100 of FIG. 1, or a combination thereof.

The method 1300 includes, at block 1302, determining, at a host device coupled to a flash memory device, that a particular region of a logical-to-physical (L2P) address mapping table is to be removed from a L2P cache of the host device, the L2P address mapping table configured to include mappings between logical memory addresses and physical memory addresses of the flash memory device. For example, the host device 102 is coupled to the flash memory device 104. The HCI 112 of the host device 102 determines that the region 152A of the L2P address mapping table 174 is to be removed from the L2P cache 122 of the host device 102, as described with reference to FIGS. 1 and 5. The L2P address mapping table 174 is configured to include mappings between the logical memory addresses 140 and the physical memory addresses 142 of the flash memory 164 of the flash memory device 104.

The method 1300 also includes, at block 1304, identifying, at the host device, a particular sub-region of the particular region having an access metric that satisfies a retention criterion. For example, the HCI 112 of the host device 102 identifies the sub-region 182AA of the region 152A having the sub-region access metric 192AA that satisfies the sub-region retention criterion 186, as described with reference to FIGS. 1 and 5.

The method 1300 further includes, at block 1306, storing the particular sub-region into a second cache of the host device. For example, the HCI 112 stores the sub-region 182AA in the cache 124 of the host device 102, as described with reference to FIGS. 1 and 5.

The method 1300 also includes, at block 1308, removing the particular region from the L2P cache. For example, the HCI 112 removes the region 152A from the L2P cache 122, as described with reference to FIGS. 1 and 5.

The method 1300 enables the sub-region 182AA to remain available at the host device 102 in the cache 124 subsequent to eviction of the region 152A from the L2P cache 122. A technical advantage of the method 1300 can include reducing memory access latency associated with accessing memory address mappings of logical memory addresses included in the sub-region 182AA subsequent to eviction of the region 152A from the L2P cache 122.

The method 1300 of FIG. 13 may be implemented by a FPGA device, an ASIC, a processing unit such as a CPU, a DSP, a controller, another hardware device, firmware device, or any combination thereof. As an example, the method 1300 of FIG. 13 may be performed by a processor that executes instructions, such as described with reference to FIG. 14.

Referring to FIG. 14, a block diagram of a particular illustrative implementation of a device is depicted and generally designated 1400. In various implementations, the device 1400 may have more or fewer components than illustrated in FIG. 14. In an illustrative implementation, the device 1400 may correspond to the host device 102. In an illustrative implementation, the device 1400 may perform one or more operations described with reference to FIGS. 1-13.

In a particular implementation, the device 1400 includes a processor 1406 (e.g., a CPU). The device 1400 may include one or more additional processors 1410 (e.g., one or more DSPs). The processors 1410 may include a speech and music coder-decoder (CODEC) 1408 that includes a voice coder ("vocoder") encoder 1436, a vocoder decoder 1438, or both. The processors 1410 may include the HCI 112 that is configured to be coupled to the flash memory device 104.

The device 1400 may include the system memory 114 and a CODEC 1434. The system memory 114 may include instructions 1456, that are executable by the one or more additional processors 1410 (or the processor 1406) to implement the functionality described with reference to the HCI 112. The system memory 114 may include the L2P cache 122, the cache 124, or both. The device 1400 may include a modem 1470 coupled, via a transceiver 1450, to an antenna 1452.

The device 1400 may include a display 1428 coupled to a display controller 1426. One or more speakers 1492 and one or more microphones 1494 may be coupled to the CODEC 1434. The CODEC 1434 may include a digital-to-analog converter (DAC) 1402, an analog-to-digital converter (ADC) 1404, or both. In a particular implementation, the CODEC 1434 may receive analog signals from the microphone(s) 1494, convert the analog signals to digital signals using the analog-to-digital converter 1404, and provide the digital signals to the speech and music codec 1408. The speech and music codec 1408 may process the digital signals. In a particular implementation, the speech and music codec 1408 may provide digital signals to the CODEC 1434. The CODEC 1434 may convert the digital signals to analog signals using the digital-to-analog converter 1402 and may provide the analog signals to the speaker(s) 1492.

In a particular implementation, the device 1400 may be included in a system-in-package or system-on-chip device 1422. In a particular implementation, the system memory 114, the processor 1406, the processors 1410, the display controller 1426, the CODEC 1434, and the modem 1470 are included in the system-in-package or system-on-chip device 1422. In a particular implementation, an input device 1430, a power supply 1444, and the flash memory device 104 are coupled to the system-in-package or the system-on-chip device 1422. Moreover, in a particular implementation, as illustrated in FIG. 14, the display 1428, the input device 1430, the speaker(s) 1492, the microphone(s) 1494, the antenna 1452, the flash memory device 104, and the power supply 1444 are external to the system-in-package or the system-on-chip device 1422. In a particular implementation, each of the display 1428, the input device 1430, the speaker(s) 1492, the microphone(s) 1494, the antenna 1452, the flash memory device 104, and the power supply 1444 may be coupled to a component of the system-in-package or the system-on-chip device 1422, such as an interface or a controller. For example, the flash memory device 104 may be coupled to the HCI 112.

The device 1400 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for determining that a particular region of a logical-to-physical (L2P) mapping table is to be removed from a L2P cache of a host device, the L2P address mapping table configured to include mappings between logical memory addresses and physical memory addresses of a flash memory device. For example, the means for determining that a particular region is to be removed can correspond to the HCI 112, the host device 102, the system 100 of FIG. 1, the processor 1406, the processor(s) 1410, one or more other circuits or components configured to determine that a particular region is to removed, or any combination thereof.

The apparatus also includes means for identifying a particular sub-region of the particular region having an access metric that satisfies a retention criterion. For example, the means for identifying a particular sub-region can correspond to the HCI 112, the host device 102, the system 100 of FIG. 1, the processor 1406, the processor(s) 1410, one or more other circuits or components configured to identify a particular sub-region, or any combination thereof.

The apparatus further includes means for storing the particular sub-region into a second cache of the host device. For example, the means for storing can correspond to the HCI 112, the host device 102, the system 100 of FIG. 1, the processor 1406, the processor(s) 1410, one or more other circuits or components configured to identify a particular sub-region, or any combination thereof.

The apparatus also includes means for removing the particular region from the L2P cache. For example, the means for removing the particular region from the L2P cache can correspond to the HCI 112, the host device 102, the system 100 of FIG. 1, the processor 1406, the processor(s) 1410, one or more other circuits or components configured to remove the particular region, or any combination thereof.

In some implementations, a non-transitory computer-readable medium (e.g., a computer-readable storage device, such as the system memory 114) includes instructions (e.g., the instructions 1456) that, when executed by one or more processors (e.g., the one or more processors 1410 or the processor 1406), cause the one or more processors to determine that a particular region (e.g., the region 152A) of a logical-to-physical (L2P) mapping table (e.g., the L2P address mapping table 174) is to be removed from a L2P cache (e.g., the L2P cache 122) of a host device (e.g., the host device 102), the L2P address mapping table configured to include mappings between logical memory addresses (e.g., the logical memory addresses 140) and physical memory addresses (e.g., the physical memory addresses 142) of a flash memory device (e.g., the flash memory 164 of the flash memory device 104). The instructions further cause the one or more processors to identify a particular sub-region (e.g., the sub-region 182AA) of the particular region having an access metric (e.g., the sub-region access metric 192AA) that satisfies a retention criterion (e.g., the sub-region retention criterion 186). The instructions also cause the one or more processors to store the particular sub-region into a second cache (e.g., the cache 124) of the host device. The instructions further cause the one or more processors to remove the particular region from the L2P cache.

Particular aspects of the disclosure are described below in sets of interrelated Examples:

According to Example 1, a host device includes system memory including a logical-to-physical (L2P) cache and a second cache; and a host controller interface (HCI) configured to be coupled to a flash memory device and configured to determine that a particular region of a L2P address mapping table is to be removed from the L2P cache, the L2P address mapping table configured to include mappings between logical memory addresses and physical memory addresses of the flash memory device; identify a particular sub-region of the particular region having an access metric that satisfies a retention criterion; store the particular sub-region into the second cache; and remove the particular region from the L2P cache.

Example 2 includes the host device of Example 1, wherein the L2P cache corresponds to a Host Performance Booster (HPB) cache, and wherein the second cache is implemented in a recently inactivated region (RIR) partition of the system memory.

Example 3 includes the host device of Example 1 or Example 2, wherein the HCI is configured to, in response to a cache miss resulting from a first cache lookup at the L2P cache, perform a second cache lookup at the second cache.

Example 4 includes the host device of any of Examples 1 to 3, wherein the HCI is configured to perform a cache lookup at the second cache including comparing a logical address of data to be accessed to logical addresses corresponding to sub-regions stored in the second cache; and in response to detecting a match of the logical address to particular logical addresses of the particular sub-region stored in the second cache, read a physical address associated with the logical address from the particular sub-region and send the physical address to the flash memory device in conjunction with a request to access the data.

Example 5 includes the host device of any of Examples 1 to 4, wherein the HCI is configured to remove a second region from the L2P cache in response to a notification from the flash memory device that the second region is to be removed.

Example 6 includes the host device of any of Examples 1 to 5, wherein the HCI is configured to determine that the particular region is to be removed in response to a cache miss resulting from a cache lookup of a logical address at the L2P cache and at the second cache.

Example 7 includes the host device of Example 6, wherein the HCI is configured to, in response to the cache miss: send the logical address to the flash memory device; receive a replacement region that includes a first sub-region associated with the logical address; and after removing the particular region from the L2P cache, store the replacement region in the L2P cache.

Example 8 includes the host device of any of Examples 1 to 7, wherein the access metric is based on a count of accesses to the particular sub-region.

Example 9 includes the host device of any of Examples 1 to 8, wherein the HCI is further configured to maintain a counter for each sub-region of the particular region, wherein the counter for a sub-region is updated each time that sub-region is accessed.

Example 10 includes the host device of any of Examples 1 to 9, wherein the HCI is configured to identify the particular sub-region responsive to determining that a counter associated with the particular sub-region has a highest counter value of counters that are associated with sub-regions of the particular region.

Example 11 includes the host device of any of Examples 1 to 10, wherein the HCI is configured to determine that the retention criterion is satisfied based on determining that the access metric exceeds an access count threshold.

Example 12 includes the host device of any of Examples 1 to 11, wherein the access metric is stored in the L2P cache.

Example 13 includes the host device of any of Examples 1 to 12, wherein the HCI is configured to responsive to determining that the second cache is full, determine that a second sub-region is to be removed from the second cache; and remove the second sub-region from the second cache, wherein the particular sub-region is stored into the second cache after removing the second sub-region from the second cache.

Example 14 includes the host device of Example 13, wherein the HCI is configured to determine that the second sub-region is to be removed responsive to determining that the second sub-region has a second access metric that satisfies a sub-region eviction criterion.

Example 15 includes the host device of Example 14, wherein the second access metric includes a first sub-region added to the second cache, a less than threshold access count, or both.

According to Example 16, a method includes at a host device coupled to a flash memory device: determining that a particular region of a logical-to-physical (L2P) mapping table is to be removed from a L2P cache of the host device, the L2P address mapping table configured to include mappings between logical memory addresses and physical memory addresses of the flash memory device; identifying a particular sub-region of the particular region having an access metric that satisfies a retention criterion; storing the particular sub-region into a second cache of the host device; and removing the particular region from the L2P cache.

Example 17 includes the method of Example 16, wherein the L2P cache corresponds to a Host Performance Booster (HPB) cache in a system memory of the host device, and wherein the second cache is implemented in a recently inactivated region (RIR) partition of the system memory of the host device.

Example 18 includes the method of Example 16 or Example 17, further comprising, in response to a cache miss resulting from a first cache lookup at the L2P cache, performing a second cache lookup at the second cache.

Example 19 includes the method of any of Examples 16 to 18 and further includes performing a cache lookup at the second cache including: comparing a logical address of data to be accessed to logical addresses corresponding to sub-regions stored in the second cache; and in response to detecting a match of the logical address to the particular sub-region stored in the second cache, reading a physical address associated with the logical address from the particular sub-region and sending the physical address to the flash memory device in conjunction with a request to access the data.

Example 20 includes the method of any of Examples 16 to 19, and further includes removing a second region from the L2P cache responsive to a notification from the flash memory device that the second region is to be removed.

Example 21 includes the method of any of Examples 16 to 20, wherein the particular region is to be removed is determined responsive to a cache miss resulting from a cache lookup of a logical address at the L2P cache and at the second cache, and further comprising, in response to the cache miss: sending the logical address to the flash memory device; receiving a replacement region that includes a first sub-region associated with the logical address; and after removing the particular region from the L2P cache, storing the replacement region in the L2P cache.

Example 22 includes the method of any of Examples 16 to 21, wherein the access metric is based on a count of accesses to the particular sub-region.

Example 23 includes the method of any of Examples 16 to 22 and further includes maintaining a counter for each sub-region of the particular region, wherein the counter for a sub-region is updated each time that sub-region is accessed.

Example 24 includes the method of any of Examples 16 to 23, wherein the particular sub-region is identified responsive to determining that a counter associated with the particular sub-region has a highest counter value of counters that are associated with sub-regions of the particular region.

Example 25 includes the method of any of Examples 16 to 24, wherein satisfying the retention criterion includes determining that the access metric exceeds an access count threshold.

Example 26 includes the method of any of Examples 16 to 25, wherein the access metric is stored in the L2P cache.

Example 27 includes the method of any of Examples 16 to 26, further includes responsive to determining that the second cache is full, determining that a second sub-region is to be removed from the second cache; and removing the second sub-region from the second cache, wherein the particular sub-region is stored into the second cache after removing the second sub-region from the second cache.

Example 28 includes the method of Example 27, wherein the second sub-region is to be removed is determined responsive to determining that the second sub-region has a second access metric that satisfies a sub-region eviction criterion.

Example 29 includes the method of Example 28, wherein the second access metric includes a first sub-region added to the second cache, a less than threshold access count, or both.

According to Example 30, a device includes: a memory configured to store instructions; and a processor configured to execute the instructions to perform the method of any of Example 16 to 29.

According to Example 31, a non-transitory computer-readable medium stores instructions that, when executed by a processor, cause the processor to perform the method of any of Example 16 to Example 29.

According to Example 32, an apparatus includes means for carrying out the method of any of Example 16 to Example 29.

According to Example 33, a non-transitory computer-readable medium storing instructions that, when executed by one or more processors, cause the one or more processors to determine that a particular region of a logical-to-physical (L2P) mapping table is to be removed from a L2P cache of a host device, the L2P address mapping table configured to include mappings between logical memory addresses and physical memory addresses of a flash memory device; identify a particular sub-region of the particular region having an access metric that satisfies a retention criterion; store the particular sub-region into a second cache of the host device; and remove the particular region from the L2P cache.

According to Example 34, an apparatus includes means for determining that a particular region of a logical-to-physical (L2P) mapping table is to be removed from a L2P cache of a host device, the L2P address mapping table configured to include mappings between logical memory addresses and physical memory addresses of a flash memory device; means for identifying a particular sub-region of the particular region having an access metric that satisfies a retention criterion; means for storing the particular sub-region into a second cache of the host device; and means for removing the particular region from the L2P cache.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD- ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A host device comprising:
   system memory including a logical-to-physical (L2P) cache and a second cache; and
   a host controller interface (HCI) configured to be coupled to a flash memory device and configured to:
      copy a particular region of a L2P address mapping table to the L2P cache, the L2P address mapping table configured to include mappings between logical memory addresses and physical memory addresses of the flash memory device;
      determine that the particular region is to be removed from the L2P cache;
      in response to the determination that the particular region is to be removed, identify a particular sub-region to be retained that has an access metric that satisfies a retention criterion, wherein the particular sub-region is a sub-region of the particular region;
      in response to the identification of the particular sub-region, store the particular sub-region into the second cache; and
      after the storage of the particular sub-region into the second cache and in response to the determination that the particular region is to be removed, remove the particular region from the L2P cache.

2. The host device of claim 1, wherein the L2P cache corresponds to a Host Performance Booster (HPB) cache, and wherein the second cache is implemented in an inactivated region partition of the system memory.

3. The host device of claim 1, wherein the HCI is configured to, in response to a cache miss resulting from a first cache lookup at the L2P cache, perform a second cache lookup at the second cache.

4. The host device of claim 1, wherein the HCI is configured to:
   after the storage of the particular sub-region into the second cache, perform a cache lookup at the second cache including comparing a logical address of data to be accessed to logical addresses corresponding to sub-regions stored in the second cache; and
   in response to detecting a match of the logical address to particular logical addresses of the particular sub-region stored in the second cache, read a physical address associated with the logical address from the particular sub-region and send the physical address to the flash memory device in conjunction with a request to access the data.

5. The host device of claim 1, wherein the HCI is configured to remove a second region from the L2P cache in response to a notification from the flash memory device that the second region is to be removed.

6. The host device of claim 1, wherein the HCI is configured to determine that the particular region is to be removed in response to a cache miss resulting from a cache lookup of a logical address at the L2P cache and at the second cache.

7. The host device of claim 1, wherein the access metric is based on a count of accesses to the particular sub-region.

8. The host device of claim 1, wherein the HCI is further configured to maintain a counter for each sub-region of the particular region, wherein the counter for a sub-region is updated each time that sub-region is accessed.

9. The host device of claim 1, wherein the HCI is configured to identify the particular sub-region responsive to determining that a counter associated with the particular sub-region has a highest counter value of counters that are associated with sub-regions of the particular region.

10. The host device of claim 1, wherein the HCI is configured to determine that the retention criterion is satisfied based on determining that the access metric exceeds an access count threshold.

11. The host device of claim 1, wherein the access metric is stored in the L2P cache.

12. The host device of claim 1, wherein the HCI is configured to:
    responsive to determining that the second cache is full, determine that a second sub-region is to be removed from the second cache; and
    remove the second sub-region from the second cache, wherein the particular sub-region is stored into the second cache after removing the second sub-region from the second cache.

13. The host device of claim 6, wherein the HCI is configured to, in response to the cache miss:
    send the logical address to the flash memory device;
    receive a replacement region that includes a first sub-region associated with the logical address; and
    after removing the particular region from the L2P cache, store the replacement region in the L2P cache.

14. The host device of claim 12, wherein the HCI is configured to determine that the second sub-region is to be removed responsive to determining that the second sub-region has a second access metric that satisfies a sub-region eviction criterion.

15. The host device of claim 14, wherein the second access metric includes a first sub-region added to the second cache, a less than threshold access count, or both.

16. A method comprising:
    at a host device coupled to a flash memory device:
       copying a particular region of a logical-to-physical (L2P) address mapping table to a L2P cache of the host device, the L2P address mapping table configured to include mappings between logical memory addresses and physical memory addresses of the flash memory device;
       determining that the particular region is to be removed from the L2P cache;
       in response to determining that the particular region is to be removed, identifying a particular sub-region to be retained that has an access metric that satisfies a retention criterion, wherein the particular sub-region is a sub-region of the particular region;

in response to identifying the particular sub-region, storing the particular sub-region into a second cache of the host device; and after storing the particular sub-region in the second cache and in response to determining that the particular region is to be removed, removing the particular region from the L2P cache.

17. The method of claim 16, wherein the L2P cache corresponds to a Host Performance Booster (HPB) cache in a system memory of the host device, and wherein the second cache is implemented in an inactivated region partition of the system memory of the host device.

18. The method of claim 16, further comprising, in response to a cache miss resulting from a first cache lookup at the L2P cache, performing a second cache lookup at the second cache.

19. The method of claim 16, further comprising performing a cache lookup at the second cache including:

after storing the particular sub-region into the second cache, comparing a logical address of data to be accessed to logical addresses corresponding to sub-regions stored in the second cache; and in response to detecting a match of the logical address to the particular sub-region stored in the second cache, reading a physical address associated with the logical address from the particular sub-region and sending the physical address to the flash memory device in conjunction with a request to access the data.

20. The method of claim 16, further comprising removing a second region from the L2P cache responsive to a notification from the flash memory device that the second region is to be removed.

21. The method of claim 16, wherein the particular region is to be removed is determined responsive to a cache miss resulting from a cache lookup of a logical address at the L2P cache and at the second cache, and further comprising, in response to the cache miss:

sending the logical address to the flash memory device;

receiving a replacement region that includes a first sub-region associated with the logical address; and after removing the particular region from the L2P cache, storing the replacement region in the L2P cache.

22. The method of claim 16, wherein the access metric is based on a count of accesses to the particular sub-region.

23. The method of claim 16, further comprising maintaining a counter for each sub-region of the particular region, wherein the counter for a sub-region is updated each time that sub-region is accessed.

24. The method of claim 16, wherein the particular sub-region is identified responsive to determining that a counter associated with the particular sub-region has a highest counter value of counters that are associated with sub-regions of the particular region.

25. The method of claim 16, wherein satisfying the retention criterion includes determining that the access metric exceeds an access count threshold.

26. The method of claim 16, wherein the access metric is stored in the L2P cache.

27. The method of claim 16, further comprising:

responsive to determining that the second cache is full, determining that a second sub-region is to be removed from the second cache; and removing the second sub-region from the second cache, wherein the particular sub-region is stored into the second cache after removing the second sub-region from the second cache.

28. The method of claim 27, wherein the second sub-region is to be removed is determined responsive to determining that the second sub-region has a second access metric that satisfies a sub-region eviction criterion, and wherein the second access metric includes a first sub-region added to the second cache, a less than threshold access count, or both.

29. A non-transitory computer-readable medium storing instructions that, when executed by one or more processors, cause the one or more processors to:

copy a particular region of a logical-to-physical (L2P) address mapping table to a L2P cache of a host device, the L2P address mapping table configured to include mappings between logical memory addresses and physical memory addresses of a flash memory device;

determine that the particular region is to be removed from the L2P cache;

in response to the determination that the particular region is to be removed, identify a particular sub-region to be retained that has an access metric that satisfies a retention criterion, wherein the particular sub-region is a sub-region of the particular region;

in response to the identification of the particular sub-region, store the particular sub-region into a second cache of the host device; and after the storage of the particular sub-region into the second cache and in response to the determination that the particular region is to be removed, remove the particular region from the L2P cache.

30. An apparatus comprising:

means for copying a particular region of a logical-to-physical (L2P) address mapping table to a L2P cache of a host device, the L2P address mapping table configured to include mappings between logical memory addresses and physical memory addresses of a flash memory device;

means for determining that the particular region is to be removed from the L2P cache;

means for identifying, in response to a determination that the particular region is to be removed, a particular sub-region to be retained that has an access metric that satisfies a retention criterion, wherein the particular sub-region is a sub-region of the particular region;

means for storing, in response to an identification of the particular sub-region, the particular sub-region into a second cache of the host device; and means for removing, after storage of the particular sub-region into the second cache and in response to the determination that the particular region is to be removed, the particular region from the L2P cache.

* * * * *